US007493289B2

(12) United States Patent
Verosub et al.

(10) Patent No.: US 7,493,289 B2
(45) Date of Patent: Feb. 17, 2009

(54) DIGITAL CONTENT STORE SYSTEM

(75) Inventors: Ellis Verosub, San Francisco, CA (US);
Sanjeev Tenneti, Milpitas, CA (US);
Kamal Acharya, Los Altos, CA (US);
Solomon D. Goldfarb, San Jose, CA (US); Todd Pringle, San Mateo, CA (US); David S. Bill, San Francisco, CA (US); Shailesh Prakash, Redmond, WA (US); Adam Milligan, Bellevue, WA (US)

(73) Assignee: AOL LLC, Dulles, VA (US)

( * ) Notice: Subject to any disclaimer, the term of this patent is extended or adjusted under 35 U.S.C. 154(b) by 964 days.

(21) Appl. No.: 10/734,991

(22) Filed: Dec. 11, 2003

(65) Prior Publication Data
US 2004/0205028 A1    Oct. 14, 2004

Related U.S. Application Data

(60) Provisional application No. 60/433,734, filed on Dec. 13, 2002.

(51) Int. Cl.
*H04L 9/00* (2006.01)
(52) U.S. Cl. .................. 705/51; 713/168; 713/164; 705/1; 705/50; 705/56
(58) Field of Classification Search .......... 705/50, 705/1, 56
See application file for complete search history.

(56) References Cited

U.S. PATENT DOCUMENTS 5,168,481 A    12/1992    Culbertson et al.
5,325,238 A    6/1994    Stebbings et al.
5,517,672 A    5/1996    Reussner et al.

(Continued)

FOREIGN PATENT DOCUMENTS

EP    1113605 A2    7/1991

(Continued)

OTHER PUBLICATIONS

Xu, C., Feng, D. "Web based Protection and Secure Distribution for Digital Music", Proceedings, International Conference on Internet and Multimedia Systems and Applications pp. 102-107 Hawaii, USA, Aug. 13-16, 2001.

(Continued)

*Primary Examiner*—Calvin Loyd Hewitt, II
*Assistant Examiner*—John M Winter
(74) *Attorney, Agent, or Firm*—Michael A. Glenn; Glenn Patent Group

(57) ABSTRACT

The digital content store provides users with an opportunity to purchase authorized usage of digital content, such as single or multiple music tracks, video, movies, and/or video games. The users can also buy license to a desired track for a fixed number of times, e.g. preferably the users can listen on three different machines simultaneously. Users can also burn a play list of X number of times, for example ten. The burn limit preferably applies to the play list, not the song. Mixed media capability is provided that allows the purchase of digital content and/or physical media. The digital content store system comprises a unique digital rights management system and a back-end enabling system that controls these digital rights.

15 Claims, 15 Drawing Sheets

U.S. PATENT DOCUMENTS

| | | | |
|---|---|---|---|
| 5,528,513 A | 6/1996 | Vaitzblit et al. | |
| 5,585,866 A | 12/1996 | Miller et al. | |
| 5,616,876 A | 4/1997 | Cluts | |
| 5,644,715 A | 7/1997 | Baugher | |
| 5,671,195 A | 9/1997 | Lee | |
| 5,715,314 A * | 2/1998 | Payne et al. | 705/78 |
| 5,734,119 A | 3/1998 | France et al. | |
| 5,761,417 A | 6/1998 | Henley et al. | |
| 5,784,597 A | 7/1998 | Chiu et al. | |
| 5,787,482 A | 7/1998 | Chen et al. | |
| 5,792,971 A | 8/1998 | Timis et al. | |
| 5,802,502 A | 9/1998 | Gell et al. | |
| 5,819,160 A | 10/1998 | Foladare et al. | |
| 5,892,900 A | 4/1999 | Ginter et al. | |
| 5,907,827 A | 5/1999 | Fang et al. | |
| 5,910,987 A | 6/1999 | Ginter et al. | |
| 5,913,039 A | 6/1999 | Nakamura | |
| 5,915,019 A | 6/1999 | Ginter et al. | |
| 5,917,912 A | 6/1999 | Ginter et al. | |
| 5,920,861 A | 7/1999 | Hall et al. | |
| 5,930,765 A | 7/1999 | Martin | |
| 5,943,422 A | 8/1999 | Van Wie et al. | |
| 5,944,778 A | 8/1999 | Takeuchi et al. | |
| 5,949,876 A | 9/1999 | Ginter et al. | |
| 5,956,321 A | 9/1999 | Yao et al. | |
| 5,956,491 A | 9/1999 | Marks | |
| 5,959,945 A | 9/1999 | Kleiman | |
| 5,963,914 A | 10/1999 | Skinner et al. | |
| 5,982,891 A | 11/1999 | Ginter et al. | |
| 5,996,015 A | 11/1999 | Day et al. | |
| 6,029,257 A | 2/2000 | Palmer | |
| 6,031,797 A | 2/2000 | Van Ryzin et al. | |
| 6,041,354 A | 3/2000 | Biliris et al. | |
| 6,044,398 A | 3/2000 | Marullo et al. | |
| 6,061,722 A | 5/2000 | Lipa et al. | |
| 6,067,562 A | 5/2000 | Goldman | |
| 6,088,722 A | 7/2000 | Herz | |
| 6,112,023 A | 8/2000 | Dave et al. | |
| 6,112,181 A | 8/2000 | Shear et al. | |
| 6,138,119 A | 10/2000 | Hall et al. | |
| 6,157,721 A | 12/2000 | Shear et al. | |
| 6,157,940 A | 12/2000 | Marullo et al. | |
| 6,160,812 A | 12/2000 | Bauman et al. | |
| 6,163,683 A | 12/2000 | Dunn et al. | |
| 6,173,325 B1 | 1/2001 | Kukreja | |
| 6,185,683 B1 | 2/2001 | Ginter et al. | |
| 6,185,701 B1 | 2/2001 | Marullo et al. | |
| 6,192,340 B1 | 2/2001 | Abecassis | |
| 6,195,701 B1 | 2/2001 | Kaiserswerth et al. | |
| 6,199,076 B1 | 3/2001 | Logan et al. | |
| 6,222,530 B1 | 4/2001 | Sequeira | |
| 6,226,672 B1 | 5/2001 | DeMartin et al. | |
| 6,237,786 B1 | 5/2001 | Ginter et al. | |
| 6,240,185 B1 | 5/2001 | Van Wie et al. | |
| 6,243,328 B1 | 6/2001 | Fenner et al. | |
| 6,243,725 B1 | 6/2001 | Hempleman et al. | |
| 6,247,061 B1 | 6/2001 | Douceur | |
| 6,248,946 B1 | 6/2001 | Dwek | |
| 6,253,193 B1 | 6/2001 | Ginter et al. | |
| 6,262,569 B1 | 7/2001 | Carr et al. | |
| 6,263,313 B1 * | 7/2001 | Milsted et al. | 705/1 |
| 6,263,362 B1 | 7/2001 | Donoho et al. | |
| 6,266,788 B1 | 7/2001 | Othmer et al. | |
| 6,300,880 B1 | 10/2001 | Sitnik | |
| 6,314,576 B1 | 11/2001 | Asamizuya et al. | |
| 6,332,163 B1 | 12/2001 | Bowman-Amuah | |
| 6,356,936 B1 | 3/2002 | Donoho et al. | |
| 6,363,488 B1 | 3/2002 | Ginter et al. | |
| 6,366,914 B1 | 4/2002 | Stern | |
| 6,389,402 B1 | 5/2002 | Ginter et al. | |
| 6,421,651 B1 | 7/2002 | Tedesco et al. | |
| 6,427,140 B1 | 7/2002 | Ginter et al. | |
| 6,430,537 B1 | 8/2002 | Tedesco et al. | |
| 6,434,621 B1 | 8/2002 | Pezzillo et al. | |
| 6,434,628 B1 | 8/2002 | Bowman-Amuah | |
| 6,438,450 B1 | 8/2002 | DiLorenzo | |
| 6,438,630 B1 | 8/2002 | DeMoney | |
| 6,441,832 B1 | 8/2002 | Tao et al. | |
| 6,446,080 B1 | 9/2002 | Van Ryzin et al. | |
| 6,446,125 B1 | 9/2002 | Huang et al. | |
| 6,446,126 B1 | 9/2002 | Huang et al. | |
| 6,449,367 B2 | 9/2002 | Van Wie et al. | |
| 6,453,316 B1 | 9/2002 | Karibe et al. | |
| 6,477,541 B1 | 11/2002 | Korst et al. | |
| 6,477,707 B1 | 11/2002 | King et al. | |
| 6,492,469 B2 | 12/2002 | Willis et al. | |
| 6,496,744 B1 | 12/2002 | Cook | |
| 6,502,194 B1 | 12/2002 | Berman et al. | |
| 6,505,160 B1 | 1/2003 | Levy et al. | |
| 6,519,648 B1 | 2/2003 | Eyal | |
| 6,526,411 B1 | 2/2003 | Ward | |
| 6,529,586 B1 | 3/2003 | Elvins et al. | |
| 6,536,037 B1 | 3/2003 | Guheen et al. | |
| 6,542,445 B2 | 4/2003 | Ijichi et al. | |
| 6,546,397 B1 | 4/2003 | Rempell | |
| 6,550,057 B1 | 4/2003 | Bowman-Amuah | |
| 6,601,041 B1 | 7/2003 | Brown et al. | |
| 6,609,097 B2 | 8/2003 | Costello et al. | |
| 6,618,484 B1 | 9/2003 | Van Wie et al. | |
| 6,658,568 B1 | 12/2003 | Ginter et al. | |
| 6,772,340 B1 * | 8/2004 | Peinado et al. | 713/168 |
| 6,772,435 B1 | 8/2004 | Thexton et al. | |
| 6,910,220 B2 | 6/2005 | Hickey et al. | |
| 6,950,623 B2 | 9/2005 | Brown et al. | |
| 7,020,710 B2 | 3/2006 | Weber et al. | |
| 7,020,893 B2 | 3/2006 | Connelly | |
| 7,024,485 B2 | 4/2006 | Dunning et al. | |
| 7,136,906 B2 | 11/2006 | Giacalone, Jr. | |
| 7,185,352 B2 | 2/2007 | Hallford et al. | |
| 2001/0003828 A1 | 6/2001 | Peterson et al. | |
| 2001/0030660 A1 | 10/2001 | Zainoulline | |
| 2002/0032907 A1 | 3/2002 | Daneils | |
| 2002/0059237 A1 | 5/2002 | Kumagai et al. | |
| 2002/0059624 A1 | 5/2002 | Machida et al. | |
| 2002/0068525 A1 | 6/2002 | Brown et al. | |
| 2002/0078056 A1 | 6/2002 | Hunt et al. | |
| 2002/0082914 A1 | 6/2002 | Beyda et al. | |
| 2002/0091761 A1 | 7/2002 | Lambert | |
| 2002/0095510 A1 | 7/2002 | Sie et al. | |
| 2002/0104099 A1 | 8/2002 | Novak | |
| 2002/0107968 A1 | 8/2002 | Messarina | |
| 2002/0108395 A1 | 8/2002 | Fujita et al. | |
| 2002/0152876 A1 | 10/2002 | Hughes et al. | |
| 2002/0152878 A1 | 10/2002 | Akashi | |
| 2002/0198846 A1 | 12/2002 | Lao | |
| 2003/0014436 A1 | 1/2003 | Spencer et al. | |
| 2003/0018797 A1 | 1/2003 | Dunning et al. | |
| 2003/0023973 A1 | 1/2003 | Monson et al. | |
| 2003/0023975 A1 | 1/2003 | Schrader et al. | |
| 2003/0028893 A1 | 2/2003 | H. Addington | |
| 2003/0048418 A1 | 3/2003 | Hose et al. | |
| 2003/0069768 A1 | 4/2003 | Hoffman et al. | |
| 2003/0121050 A1 | 6/2003 | Kalva et al. | |
| 2003/0126275 A1 | 7/2003 | Mungavan et al. | |
| 2003/0135605 A1 | 7/2003 | Pendakur | |
| 2003/0195974 A1 | 10/2003 | Ronning et al. | |
| 2003/0236906 A1 | 12/2003 | Klemets et al. | |
| 2004/0064507 A1 | 4/2004 | Sakata | |
| 2005/0114757 A1 | 5/2005 | Sahota et al. | |
| 2005/0159104 A1 | 7/2005 | Valley et al. | |

FOREIGN PATENT DOCUMENTS

| | | |
|---|---|---|
| EP | 0831608 A2 | 3/1998 |

| | | |
|---|---|---|
| EP | 0875846 A2 | 11/1998 |
| EP | 0986046 A1 | 3/2000 |
| EP | 1178487 A1 | 2/2002 |
| EP | 1187423 A2 | 3/2002 |
| EP | 1229476 A2 | 8/2002 |
| EP | 1244021 A1 | 9/2002 |
| EP | 1267247 A2 | 12/2002 |
| EP | 1286351 A2 | 2/2003 |
| EP | 1187485 B1 | 4/2003 |
| JP | 2002108395 | 4/2002 |
| JP | 2002318587 | 10/2002 |
| JP | 2003069768 | 3/2003 |
| TW | 497055 | 8/2002 |
| WO | WO 01/10496 A2 | 2/2001 |
| WO | WO 02/063414 | 8/2002 |

OTHER PUBLICATIONS

Apple's iTune Music Store—http:// www.apple.com/music/store.
Conference Paper: IP Data Over Satelite to Cable Headends and a New Operation Model with Digital Store and Forward Multi-Media Systems.
A Network Flow Model for Playlist Generation; Department of Electrical Engineering, Univeristy of Minnesota.
Learning a Gaussian Process Prior for Automatically Generating Music Playlists; Microsoft Corporation.
EasyLiving:Technologies for Intelligent Environments; Microsoft Research.
Intelligent Multicast Internet Radio; University of Dublin.
Flytrap: Intelligent Group Music Recommendation; IUI 02. 2002 International Conference on Intelligent User Interfaces.
Virtual Jukebox; reviving a classic; Proceedings of the 35th Annual Hawaii International Conference on System Sciences, p. 887-93.
The MP3 Revolution; IEEE Intelligent Systems vol. 14, No. 3, p. 8-9.
The Valid Web: an Infrastructure for Temporal Management of Web Documents; ADVIS 2000; Lecture Notes in Computer Science; vol. 1909, p. 294-303, Izmir, Turkey; pub: Soringer-Verlag; 2000; xvi-460pp.; Germany.
Usability Studies and Designing Navigational Aids for the World Wide Web; 6th Intl World Wide Web Conf.; Santa Clara, CA; USA; Pub: Elsevier Comput. Netw. ISDN Syste; vol. 29, No. 8-13, p. 1489-96; Sep. 1997; Netherlands.
Coordinated CPU and Event Scheduling for Distributed Multimedia Applciations:, ACM Multimedia; Ottawa, Canada.
"Packet Synchronization Recovery Circuit" vol. 16, No. 294, p. 120.
Hodson, O., Perkins, C., Hardman, V., "Skew detection and compensation for Inernet audio application" Part vol. 3, p. 1687-90, 2000 IEEE International Conference on Multimedia Proceedings, USA.
Aurrecoechea, C., Campbell, A., Hauw, L., "A Survey of QoS Architectures", Columbia University, New York.
Cen,S., Pu, R., Staehi, R.,Walpole, J., "A Distributed Real-Time MPEG Video Audio Player", Dept of Computer Science and Engineering, Oregon Graduate Institute of Science and Technology.
Manouselis,N.,Karampiperis, P., Vardiambasis,I.O., Maras, A., "Digital Audio Broadcasting Systems under a QoS Perspective", Telecommunications Laboratory, Dept. of Electronics & Computer Engineering, Technical University of Crete, Greece.
Helix Universal Gateway Configuration Guide, RealNetworks Technical Blueprint Series.
Sion, R., Elmagarmid, A., Prabhakar, S., Rezgui, A., Challenges in designing a QoS aware Media Repository (working draft) Computer Science, Purdue University, IN.
Chen, Z., Tan,S.-M., Campbell, R., Li, Y., "Real Time Video and Audio in the World Wide Web". Dept. of Computer Science, Univ. of Illinios, Champagne—Urbana.
Content Networking with the Helix Platform, RealNetworks White Paper Series, Jul. 2002.
Hess, C., Media Streaming Protocol: An Adaptive Protocol for the Delivery of Audio and Video Over the Internet, 1998, Univ. of Illinois, Champagne-Urbana.
Koster, R., "Design of a Multimedia Player with Advanced QoS Control", Jan. 1997, Oregon Graduate Institute of Science and Technology.

Narasimha, R. et al. "I/O Issues in a Multimedia System"; Computer, vol. 27, No. 3, p. 69-74, Mar. 1994, USA.
Ramakrishnan, K.K. et al; "Operating system Support for a video-on-demand file service"; Multimedia Systems; vol. 3, No. 2, p. 53-65, 1995 West Germany.
Nwosu, K.C. et al "Data Allocation and Spatio-Temporal Implications for Video-on-Demand Systems"; Proceedings of 1995 14th Annual Phoenix Conference on Computers and Communications; (Cat. No. 95CH35751), p. 629-35; IEEE: 1995 USA.
Eun, S,: et al. "Nonpreemptive scheduling alogorithims for multimedia communication in local area networks"; Proceedings 1995 Int'l Conf on Network Protocols (Cat. No. 95TB8122) p. 356-IEEE Comput. Soc. Press; 1995 Los Alamitos, CA USA 1996.
Nakajima, T.; "A Dynamic QoS control based on Optimistic processor reservation"; Proceedings of the Int'l onf. on Multimedia Computing and Systems (Cat. No. 96TB100057), p. 95-103, IEEE Comp. Soc. 1996, Los Alamitos, CA.
Orji, C.U. et al; "Spatio-temporal effects of mutimedia objects storage delivery on video-on-demand systems"; Mutlimedia Sytems; vol. 5, No. 1, p. 39-52, Springer-Verlag; Jan. 1997, Germany.
Kenchammana-Hosekote, D.R., et al.; "I/O scheduling for digital continuous media"; Multimedia Systems, vol. 5, No. 4, p. 213-37, Springer-Verlag, Jul. 1997 Germany.
Matsui, Y et al.; "VoR: a network system framework for VBRT over reserved bandwidth"; Interactive Distributed Mutlimedia Systems and Telecommunications Services, 4th Int'l Workshop, IDMS '97 Proceedings; p. 189-98, Springer-Verlag; 1997, Berlin, Germany.
Luling, R. et al.; "Communication Scheduling in a Distributed memory parallel interactive continuous media server system"; Proceedings of 1998 ICPP Workshop on Architectural systems and OS Support for Multimedia Applications Flexible Communications Systems, Wireless Networks and Mobile Computing; (Cat. No. 98EX206) p. 56-65; IEEE Comput. Soc, 1998 Los Alamitos, CA USA.
Seongbae, E., et al; A real-time scheduling algorithim for multimedia communication in samll dedicated multimedia systems'; KISS(A) (Computer Systems and Theory) vol. 25, No. 5, p. 492-502; Korea Inf. Sci Soc; May 1998, South Korea, 1999.
Garofalakis, M.N., et al. "Resource scheduling in enhanced pay-per-view continuous media databases"; Proceedings of 23rd Int'l Conf. on Very Large Databases; p. 516-25; Morgan, Kaufman Publishers, 1997, San Francisco, CA USA 1999.
Mostefaoui, A.; "Exploiting data structures in a high performance video server for TV archives"; Proceedings of the Int'l Symposium on Digital Media information Base, p. 516-25, World Scientific, 1998 Singapore.
Garofalakis, M.N., On periodic resource scheduling for continuous media databases: VLDB Journal, vol. 7, No. 4, p. 206-25; 1998 Springer Verlag, germany 1999.
Hwee-Hwa, P., et al. "Resource Scheduling In a High Performance Multimedia Server," IEEE, Mar.-Apr. 1999, USA.
Young-Uhg, L. et al., "Performance analysis and evaluation of allocating subbanded video dta block on MZR disk arrays"; Proceedings of teh High Performance Computing (HPC'98) p. 335-40, Soc for Comp Simulation Intn'l 1998, San Diego, CA, USA.
Feng, C. et al.; "An architecture of distributed media servers for supporting guaranteed QoS and media indexing", IEEE Intn'l Conf on Multimedia Computing and Systems, Part vol. 2 IEEE Comp. Soc. 2 vol. 1999 Los Alamitos, CA 1999.
To, T.-P.J. et al "Dynamic optimization of readsize in hypermedia servers"; IEEE Intn'l Conf on Mutlimedia Computing and Systems; Part vol. 2, p. 486-91, Pub. IEEE Comput. Soc, 2 vol. 1999 Los Alamitos, CA USA.
Lee, W. et al., "QoS-adaptive bandwidth scheduling in continuous media streaming"; Information and Software Technology; v.44n, Jun. 2002, p. 551-563.
Waddington, D.G., "Resource partitioning in general purpose operating systems; experimental results in Windows NT"; Operating Systems Review, vol. 33, No. 4, p. 52-74; ACM, Oct. 1999, USA.
Ditze, M. et al. "A method for real-time scheduling and admission control of MPE 2 streams; Part 2000; 7th Australian Conference on Parallel and Real-Time Systems", Nov. 2000, Sydney, NSW, Australia, Pub: Springer-Verlag, Hong Kong, China 2001.

Garofalakis, M., et al, "Competitive Online scheduling of continuous media streams", Journal of Computer and Systems Sciences; vol. 64, No. 2, p. 219-48, Academic Press, Mar. 2002 USA.

Wonjon, L. et al.; "QoS-adaptive bandwidth scheduling in continuos media streaming" Dept of Computer Sci and Engr, Korea University, Seoul, South Korea; Information and Software Technology, vol. 44, No. 9, p. 551-53, Seoul, Korea.

Mourlas, C.; "Deterministic scheduling of CBR and VBR media flows on parallel media servers", Euro-Par 2002 Parallel Processing 8th Intn'l Euro-Par Conference Proceedings; vol. 2400, p. 807-15, Aug. 2002, Paderborn, Germany 2003.

Buford, J.F.; "Storage server requirements for delivery of hypermedia documents", Proceedings of the SPIE—The International Society for Optical Engineering Conference, Int. Soc. Opt. Eng. vol. 2417, p. 346-55, 1995.

* cited by examiner

DIGITAL CONTENT STORE SYSTEM

CROSS REFERENCE TO RELATED APPLICATIONS

This application claims priority to prior U.S. provisional application No. 60/433,734, filed Dec. 13, 2002, entitled Music Net, which is incorporated herein in its entirety by this reference made thereto.

FIELD OF THE INVENTION

The invention relates to the transfer, processing, sale, distribution, and usage of digital content in a network environment. More particularly, the invention relates to secure sale, distribution, and usage of digital content in a network environment.

BACKGROUND OF THE INVENTION

The Internet comprises a web of computers and networks, which are widely spread throughout the world. The Internet currently comprises millions of network connections, and is used by millions of people, such as for business, education, entertainment, and/or basic communication.

Digital content, such as sound recordings, e.g. songs, are often transferred across the Internet. In addition to the basic transfer of song files, numerous network enabled radio stations have been introduced, which provide content to listeners at computers across the Internet. Network enabled radio has significantly increased the magnitude and variety of content to recipients, as compared to conventional over-the-air radio broadcasts.

There are also several music stores on which are accessible across the Internet, by which songs and/or albums may be purchased, wherein digital content files are transferred to a user terminal upon purchase.

Several structures and methods have been described for the distribution of digital content in a network environment.

V. Shear, D. Van Wie, and R. Weber, Systems and Methods for Matching, Selecting, Narrowcasting, and/or Classifying Based on Rights Management and/or Other Information, U.S. Pat. No. 6,112,181, 29 Aug. 2000, describe that "[r]ights management information is used at least in part in a matching, narrowcasting, classifying and/or selecting process. A matching and classification utility system comprising a kind of Commerce Utility System is used to perform the matching, narrowcasting, classifying and/or selecting. The matching and classification utility system may match, narrowcast, classify and/or select people and/or things, non-limiting examples of which include software objects. The Matching and Classification Utility system may use any pre-existing classification schemes, including at least some rights management information and/or other qualitative and/or parameter data indicating and/or defining classes, classification systems, class hierarchies, category schemes, class assignments, category assignments, and/or class membership. The Matching and Classification Utility may also use at least some rights management information together with any artificial intelligence, expert system, statistical, computational, manual, or any other means to define new classes, class hierarchies, classification systems, category schemes, and/or assign persons, things, and/or groups of persons and/or things to at least one class."

T. Reussner and M. Britting, Multi-Channel Device Having Storage Modules in a Loop Configuration with Main Control Unit for Controlling Data Rates and Modifying Data Selectively and Independently Therein, U.S. Pat. No. 5,517,672, 14 May 1996, describe "a multi-channel device for the digital recording and playback of audio signals, with a plurality of digital or analogue inputs and outputs and with one or more digital stores. For providing, with a not limited number of channels for recording and playback, possibilities for recording and playback over an unlimited period of time, with instantaneous access to any desired position of the recording, and carrying out overdubbing and editing without risk and freely selecting the time duration of the cross-fading, a bidirectional interface circuit with inputs and outputs is connected via a system-bus which conducts groups of parallel data, to one or more parallel connected storage modules, wherein a main control circuit driven by an operating unit is coupled to the system-bus and to the storage module or modules, and wherein each storage module comprises at least one digital store, containing an exchangeable storage medium, and at least one digital buffer store such that the audio signals which are to be stored are kept available in the buffer store for their processing or during the exchange of the storage medium."

G. Lau, Method and System for Subscription Digital Rights Management, U.S. Patent Application Publication No. 20020198846, filed 6 Jun. 2002, describes "[a] system and method for managing use of items having usage rights associated therewith. The system includes an activation device adapted to issue a software package having a public and private key pair, the public key being associated with a user, a license device adapted to issue a license, a usage device adapted to receive the software package, receive the license and allow the user to access the item in accordance with the license, and a subscription managing device adapted to maintain a subscription list including the public key associated with the user. License's is issued by the license device upon verifying presence of the public key in the subscription list corresponding to requested content."

T. Akashi, System for Delivering Music and Apparatus for Receiving Music Data, U.S. Patent Application No. 20020152878, filed Japan 23 Apr. 2001, JP 2001-124342, filed U.S. 19 Apr. 2002, Published 24 Oct. 2002, describes a music data receiving apparatus, wherein "the music data receiver receives the music data broadcast by the broadcasting station, and then the reproducer reproduces the music data while the related information storage stores the related information for the music. The user, who is listening to the reproduced music, may give a download instruction, which orders to download the air, to the user's input receiver, if the user is pleased with the air. The download instruction is transmitted to the server accessor. The server accessor accesses the music delivery server, takes out the information for specifying the air to be downloaded from the related information storage, and then notifies it to the music delivery server. The music delivery server confirms the user or charges a fee executes, and then sends the specified air data."

D. Hughes, M. Carpenter, M. Massiha, and P. Nguyen, Media Player for Distribution of Music Samples, U.S. Patent Publication No. US 20020152876, filed 20 Apr. 2001, published 24 Oct. 2002, describe a "method and apparatus of music distribution from a media player. A media player is provided with a "send to friend" icon. In one embodiment, when the icon is selected, a clipping of the currently playing music selection is taken from a predetermined location in the music selection and compressed using a fidelity reducing compression technique to produce a sample of the current selection suitable for distribution. The compressed clipping is sent to a selected recipient or recipients by email in the background while the music selection continues to play. The recipient(s) can be either a default recipient(s) or a recipient(s) selected from a list as in an address book application."

J. Dunn, P. Lee, E. Stern, and B. Willner, Broadcast Data Radio System and Receiver Apparatus Therefore, U.S. Pat. No. 6,163,683, 19 Dec. 2000, describe a "radio broadcasting system for a virtual radio program broadcasting station uses a divided regional approach to broadcast digital and analog signals over a large geographic region divided into multiple overlapping but separate areas constituting small portions of the region. The small areas are served by separate transmission sources/towers supplied from a common source central to the station. The system supports reuse of allocated transmission parameters within non-neighboring small areas in the region. The station is "virtual" because its central source need not be in any of the small areas, and because it uses different transmission parameters in neighboring small areas in a manner that previously would be used by plural different stations. System transmissions include information signals sent in both analog and digital forms. The analog signals representing audibly reproducible programs, and the digital signals include instructions for controlling operations of receiver devices operating in the region. The digital signals also may include audibly reproducible program matter and instructions for controlling insertion of that matter into a program stream defined by analog transmissions. These transmissions are particularly useful for varying tuning parameters of mobile receiver devices disclosed herein to automatically and seamlessly maintain the devices tuned to the respective virtual station throughout the region, while the devices are transported across virtual boundaries between the small areas within the region. The system enables the virtual station to alternately present audible matter of general interest throughout the region and audible matter relevant exclusively to a small area within the region (e.g. advertisements specifying locations and services offered by commercial establishments within a respective area, and announcements specifying locations of public facilities such as libraries, hospitals, etc.). Transmitted digital information is retained in mass storage units associated with receiver devices and is used for adjusting tuning parameters as a device is transported across the small areas of the region, as well as for providing a portion of the program content that is played at the device during such movement."

M. Gell, M. Manning, and J. L. Martin, System for Selective Communication Connection Based on Transaction Pricing Signals, U.S. Pat. No. 5,802,502, 01 Sep. 1998, describe a "communications network in which user equipment is provided with a selecting device which communicates with a pricing device in service provider equipment. When communications or other services are required, the selection circuit polls a plurality of service providers, and the pricing circuit of each service provider generates a price signal indicating the level of price for its services. The selection circuit then selects a service provider, based on price (and also other factors such as quality of service)."

D. Stebbings and J. Kadin, Method and Apparatus for High Speed Duplication of Audio or Digital Signals, U.S. Pat. No. 5,325,238, describe a "method of and apparatus for recording information from a master medium onto a slave medium. In one embodiment, digital information on a master medium is reproduced and stored at a first rate, typically at real time, in a first high speed digital storage device such as a magnetic disk drive. The digital information stored in the first storage device, when needed, is transferred at a second rate, much higher than the first, to a second digital storage device in which it is stored until it is scheduled for duplication, at which time the digital information is repeatedly played back at a third rate, much higher than the first rate and slower than the second rate, is converted from digital information into analog information and applied to a duplicating device for recording the analog information onto a slave medium. Because the information stored in the first digital storage device is not directly used in production, the duplicating device can be duplicating information previously transferred from the first storage device to the second at the same time information is being reproduced from a master medium and loaded, in real time, into the first storage device."

D. Spencer, W. Lutton, M. Hsu, G. Anderson, D. McMahon, and A. Schaller, Closed-Loop Delivery to Integrated Download Manager;, U.S. Patent Application Publication No. U.S. 20030014436, filed 27 Jun. 2001, Publication 16 Jan. 2003, describe "[m]ethods, apparatus and system, including computer program products, implementing and using techniques for delivery of media files to a particular digital media playback device. The system comprises a content server and a download manager located in the digital media playback device. The content server receives device-identifying information obtained from the digital media playback device, and distributes media files in response to the received device-identifying information. The download manager forwards device-identifying information to the content server over a public communication network and receives media files over the public communication network from the content server for playback on the particular digital media playback device."

Other structures and methods have been described for the distribution of content in a network environment, such as: Method and System for Downloading Digital Music, Taiwan Patent No. TW 497055; Network-Based Published Works Reproduction System, Japanese Patent No. JP 2003069768; Digital Music Data Reproduction Device Consists of Decoding and Expanding Circuits Connected Through Internal Path of Computing Element; Japanese Patent No. JP 2002108395; Web-Based Protection and Secure Distribution for Digital Music; International Conference on WEB delivering of 23-24 Nov. 2001, Changseng Xu, Yongwei Zhu, and David Dagan Feng, Florence Italy; IP Data Over Satellite to Cable Headends and a New Operation Model with Digital Store and Forward Multi-Media Systems; Conference Paper.

An iTUNES™ internet music store has been introduced by Apple Computer, Inc., of Cupertino, Calif., as seen at http://www.apple.com/music/store/, which provides for the browsing and purchase of digital music files, which are associated with usage rights, such as for playing or burning onto media.

It would be advantageous to provide a digital content store system and an associated methodology which provides acquisition and distribution of secure digital content, e.g. such as but not limited to music, video, games and software, and controlled usage of the secure digital content. The development of such a digital music store system would constitute a major technological advance.

It would also be advantageous to provide a digital content store system over a network, and an associated methodology which provides secure content and controlled usage of the secure content, wherein the client machine is not required to be connected to the network during use of the content. The development of such a digital content store system would constitute a major technological advance.

Furthermore, it would be advantageous to provide a network-enabled digital content store system and an associated methodology which provides secure digital content and controlled usage of the secure digital content, wherein the digital rights management is provided within the client machine after the content is transferred to the client machine. The development of such a digital content store system would constitute a major technological advance.

SUMMARY OF THE INVENTION

The digital content store provides users with an opportunity to purchase authorized usage of digital content, such as single or multiple music tracks, video, movies, and/or video games. The users can also buy a license to a desired track for a fixed number of times, e.g. preferably the users can listen on three different machines simultaneously. Users can also burn a play list of X number of times, for example ten. The burn limit preferably applies to the play list, not the song. Mixed media capability is provided that allows the purchase of digital content and/or physical media. The digital content store system comprises a unique digital rights management system and a back-end enabling system that controls these digital rights.

DETAILED DESCRIPTION OF PREFERRED EMBODIMENTS

Figure 1:
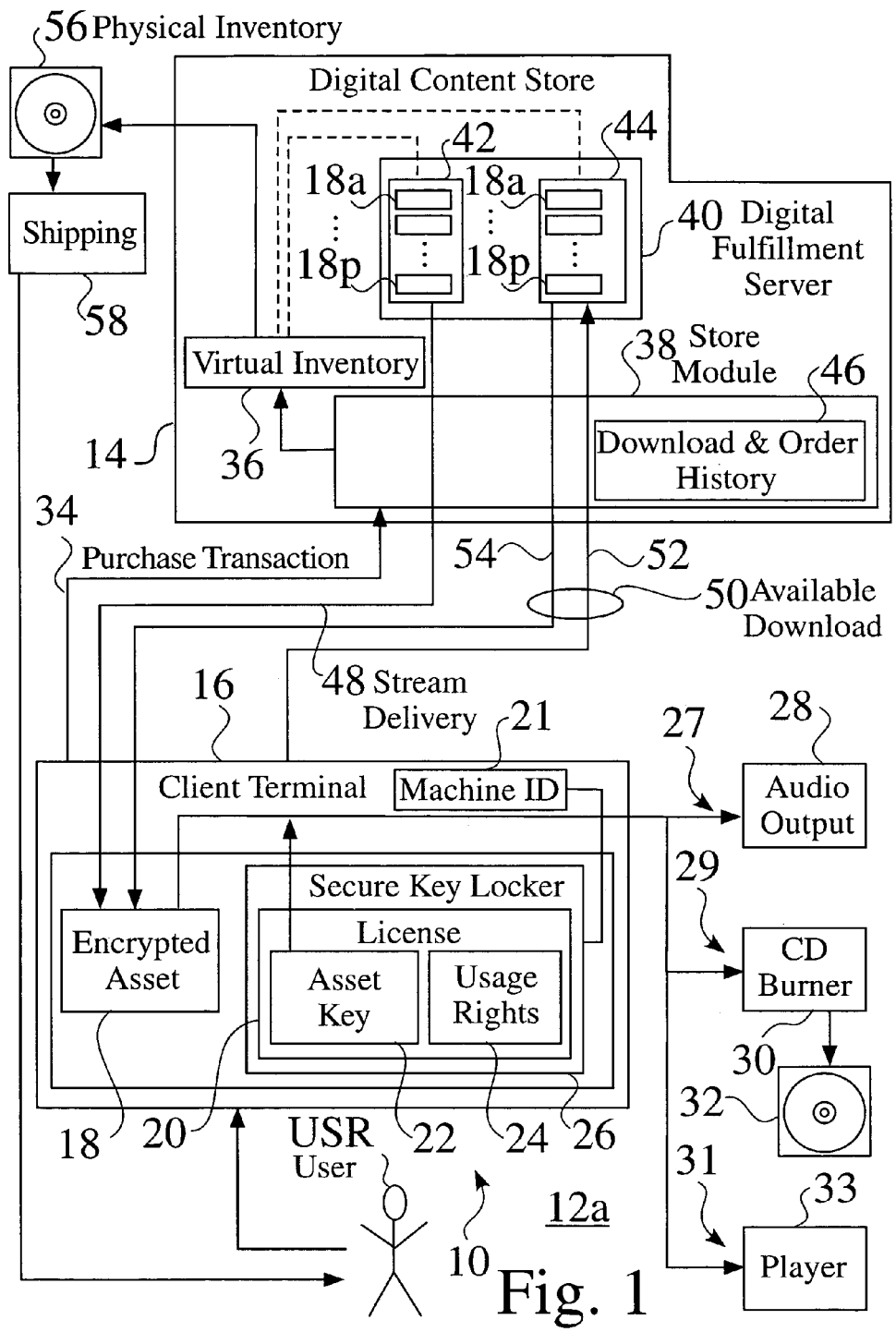
FIG. 1 is a schematic diagram of a digital music store system implemented between a client machine and a store server.
Figure 2:
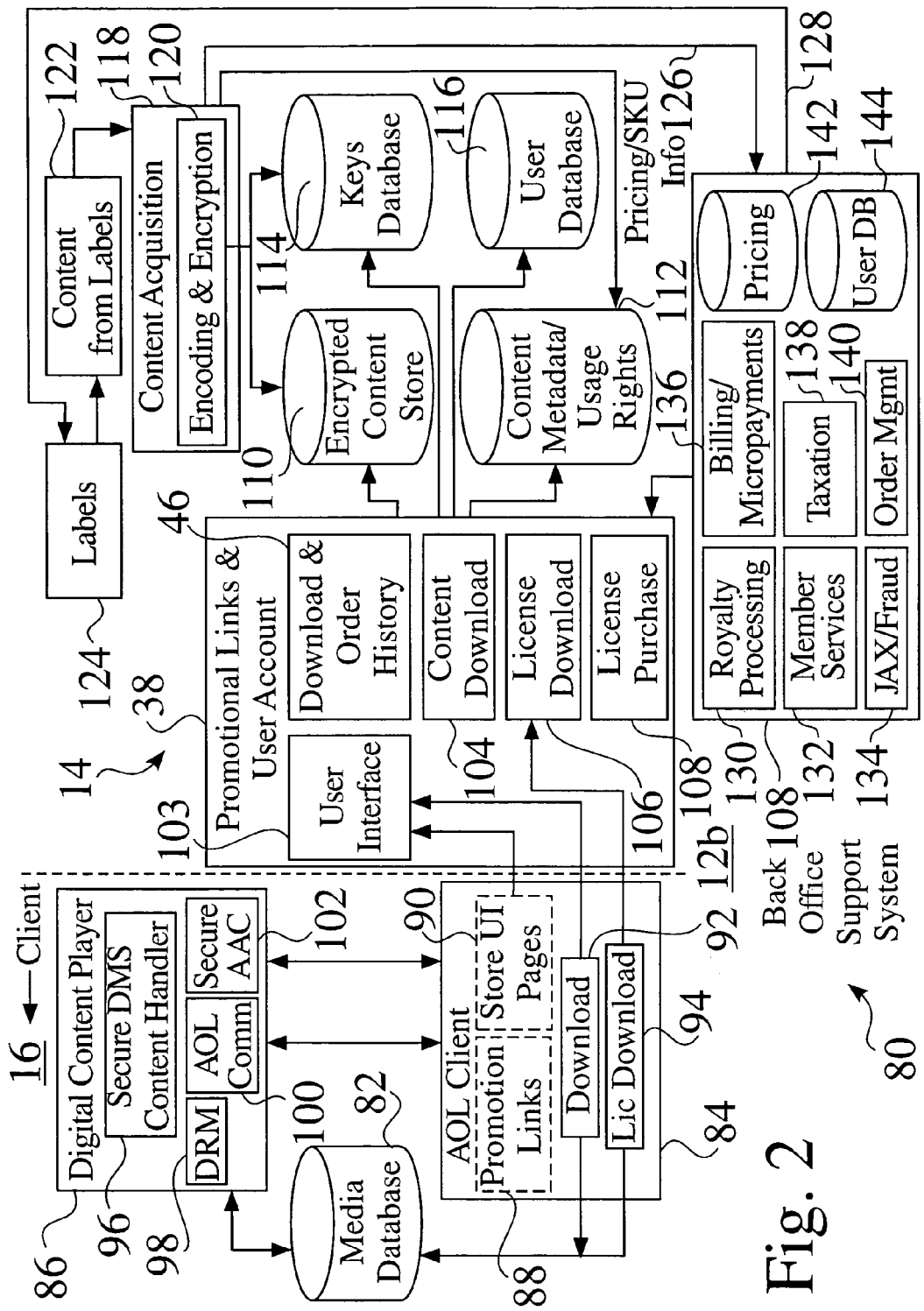
FIG. 2 is a detailed schematic diagram of client and server side architecture within a digital music store system.

FIG. 1 is a basic schematic diagram 10 of a digital content store system 12a implemented between a digital content store 14 and a client machine 16. A user USR at a client machine 16 typically accesses the digital content store 14 through a store link and account module 38, such as through a user interface 103 (FIG. 2).

The store module 38 is typically associated with a selectable inventory of assets 304 (FIG. 7), which are typically accessible 42,44, upon purchase or other redemption, as encrypted assets 18, e.g. 18a-18p, such as though a digital fulfillment center 40.

A user USR at a client machine 16 can selectably purchase encrypted assets 18, through the entry of purchase information 34, whereby the encrypted assets 18 are delivered, such as through streaming 48 and/or downloading 50, which may comprise a download prompt 52 and download delivery 54, wherein the download delivery 54 comprises both asset delivery 174 (FIG. 3) and license delivery 178 (FIG. 3) to the client 16.

In some system embodiments 12, the user USR may also purchase physical inventory of content 56, e.g. such as compact discs CDs and/or digital video disks DVDs, which are then shipped 58 to the intended user USR. Upon purchase 34, some system embodiments comprise both delivery of physical content 56, along with streaming 48 and/or downloading of encrypted digital content 18, whereby the intended user USR can quickly access content 18, such as songs, movies, games, or other content 18.

As seen in FIG. 1, a license 20 for an encrypted asset 18 comprises an asset key 22 and usage rights 24 for the encrypted asset 18. Usage of the encrypted asset 18 typically comprises playing the asset 18 through an audio output 28, or writing, i.e. burning, the asset 18 to a media 32.

The license information 20 comprises the asset rights 20 for the encrypted content 18, and comprises both an asset key 22 and usage rights 24, which are retained within a secure key locker 26. Playback of an encrypted asset 18 requires that the asset rights 20 are retrieved, i.e. extracted from the secure key locker 26, whereby the asset key 22 operates upon the asset 18, such as through decryption, decoding and/or rendering. The enabled asset is then played as desired by the user USR, in compliance with the usage rights 24. The asset key 22 is preferably bound to the client machine 16, such as through machine fingerprinting or in conjunction with the machine identification 21.

An authorized use of the encrypted asset 18 may comprise an authorized transfer 29 of the asset 18 to media or storage on a player 390 (FIG. 15), 400 (FIG. 16), e.g. an MP3 player, or to another machine 16, as allowed by usage rights 24. In conjunction with an authorized transfer 29, a modified license 20 is preferably included with the encrypted asset 18, such as comprising an asset key 22 which is unbound from the primary client machine 16, and a portion of appropriate usage rights 24, e.g. such as for authorizing play of a media 56.

Figure 7:
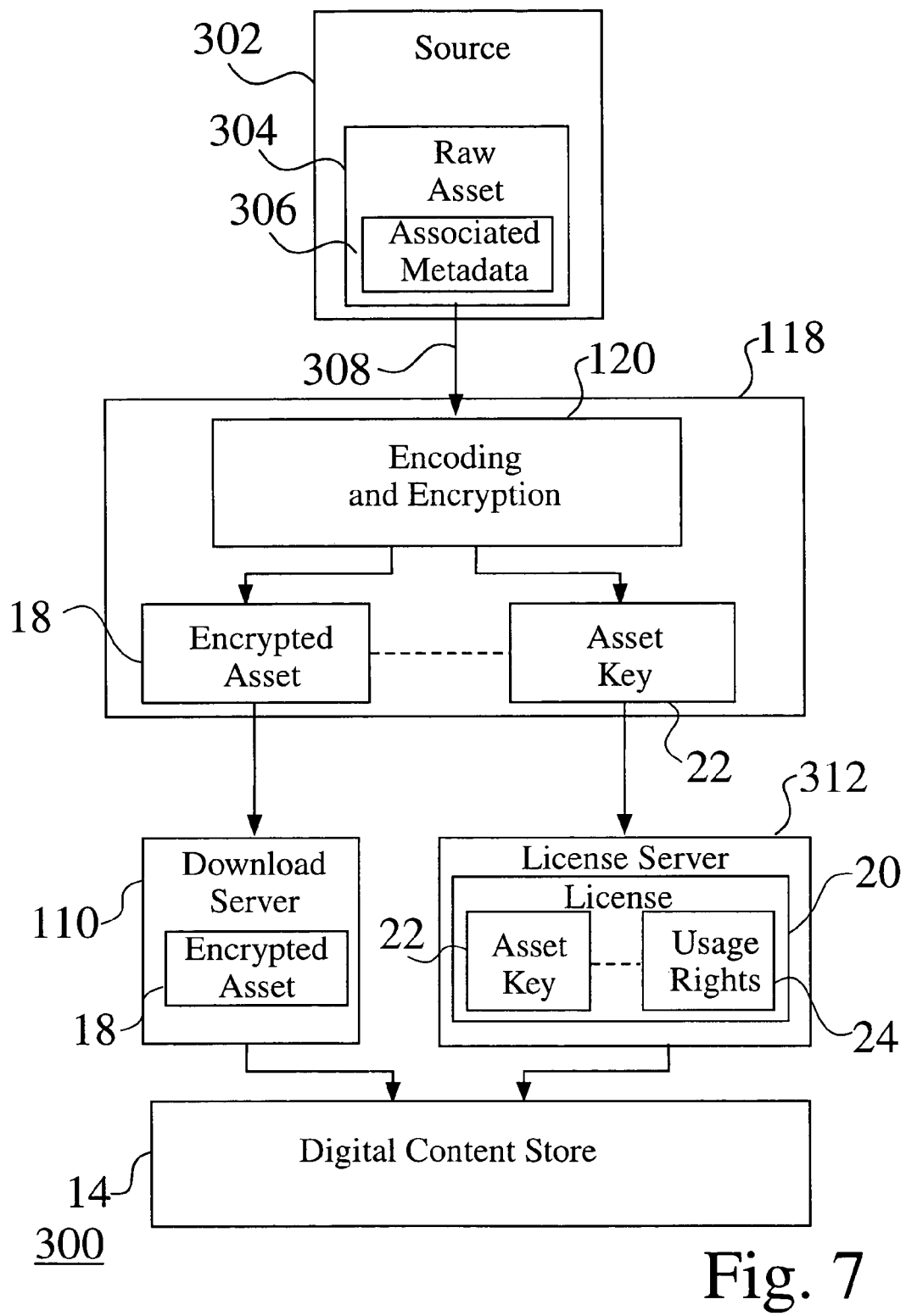
FIG. 7 is a schematic diagram of asset encryption and the establishment of an associated asset license.

FIG. 2 is a detailed schematic diagram of client and server side architecture within a digital content store system 12b. Client software 84 provides communication functionality to server 14, and to a digital content player 86, e.g. a media player 86. A media database 82 stores assets, such as acquired encrypted assets 18, and may preferably be used to store other assets, such as unencrypted assets 306 (FIG. 7) and/or associated metadata 306 (FIG. 7).

The client software 84 typically comprises a download module 92, a license download module 94, and may also comprise other functionality, such as stored user interface pages 90 and/or promotional links 88, e.g. for a digital content store 14.

The digital content player 86 typically comprises a secure digital content/music store (DMS) content handler 96, digital rights management (DRM) 98, AOL Comm 100, and secure AAC 102.

On the server side 14, promotional links and user account 38 typically comprise a user interface 103, download and order history 46, content download 104, license download 106, and license purchase 108. An encrypted content store 110 stores encrypted content 18, such as is available for purchase within the digital content store system 12. Other server storage comprises content metadata and usage rights 112, keys database 114, and a user database 116.

As seen in FIG. 2, raw content 122, such as from labels 124, is sent to content acquisition 118, wherein the incoming raw content 122, comprising raw assets 304 (FIG. 7) and associated metadata 306 (FIG. 7), is processed, within an encoding and encryption module 120.

The back office support system 108 shown in FIG. 2 comprises pricing 142, a user database 144, royalty processing 130, member services 132, billing and micropayments 136, taxation 138, order management 140, and jax/fraud 134. Pricing/SKU information 126 is typically sent to the back office support system 108, such as from metadata 306 received at content acquisition 118. As well, royalty reporting or other output information 128 is typically sent from the back office support system 108 to the labels 124.

As seen in FIG. 2, content and associated license information is sent from the server 14 to the client machine 16, through the client software 84. Encrypted content 18 is transferred to the media database 82, where it is retrievable for usage through the digital content player 86. As needed, the digital content player 86 may interact through the client software 84, such as to communicate with the server 14, e.g. to update usage information, or to prompt the user USR to acquire or extend asset rights 20.

Playback of Acquired Assets.

During playback, the digital content player playback engine 250 (FIG. 6), which is preferably secure and tamper resistant (e.g. such as provided by SAFEWRAP™, by Macrovision, Inc., of Santa Clara, Calif., extracts the asset key 22 from the secure key locker 26, and then decrypts, decodes, and renders the asset 18. The media pipeline is protected up until the handoff to the sound card 28 (FIG. 1). In preferred embodiments of the digital music store system 12, users USR do not need to be online in order to listen to their music 18.

If the digital content player 86 detects that the key 22 is missing, or is not valid for the machine 16 in question, the digital content player 86 preferably first plays a sample of the song 18, e.g. such as a 30 second clip, and then the digital content player 86 presents the user USR with a purchase opportunity. If the user USR chooses to purchase 34, they are taken to the digital music store 14 to complete the process 34. The entire key mechanism is preferably seamless to the user experience.

Acquisition of Assets and Usage Rights.

Figure 3:
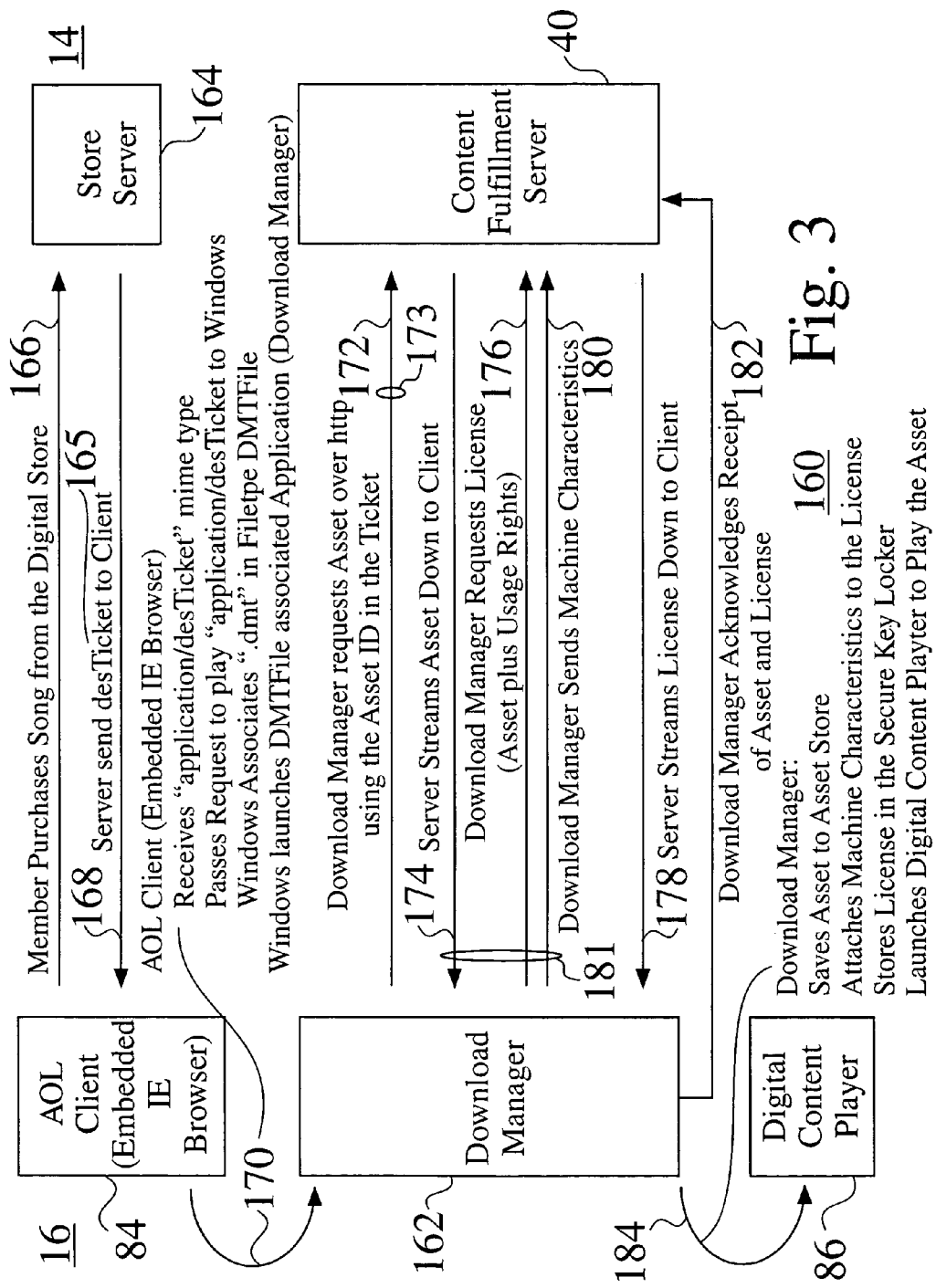
FIG. 3 is a download flowchart for a digital music store system.

FIG. 3 is a flowchart 160 showing asset purchase and download within a digital content store system 12. At a purchase step 166, user USR at a client machine 16 purchases content 18, e.g. a song, from a digital store 14, such as through a store server 164. Upon a successful purchase transaction 166, a ticket 165, e.g. such as a desTicket 165, is sent 168 to the user terminal 16, typically from the store server 164.

The ticket 165 shown in FIG. 3 is preferably a file that comprises a proprietary mime format. The ticket 165 launches the download manager (DM) 162 within the client terminal 16. The download manager 162 brokers transactions between the client machine 16 and the fulfillment server 40.

In some system applications, a browser 84 within the client machine 16 is used to send purchase information 166 and receive the ticket 165. For example, the browser 84 may be internet browser software 84, or proprietary client software 84, e.g. AOL CLIENT™ software 84, available through America Online Inc. (AOL), of Dulles, Va., which acts as an embedded browser 84, such as within INTERNET EXPLORER™, available through Microsoft, Inc., of Redmond, Wash.

At step 170 shown in FIG. 3, the browser 84 receives the ticket 165, and passes a request to play the ticket, e.g. "application/desTicket" to the operating system 260 (FIG. 6), e.g. Windows. The operating system 260 typically associates "application/desTicket" 165 with a .dmt file extension, and associates .dmt to a filetype DMTFile. The operating system 260 then launches the download manager 162 application, which is associated with the DMTFile.

The download manager 162 requests 172 the asset 18 from the content fulfillment server 40, such as over an established http connection 173. The asset 18 is sent or streamed 174 down to the client 16, in response to the request 172.

The download manager 162 also requests 176 a license 20 corresponding to the asset 18 from the fulfillment server 40, and sends 180 machine characteristics 21, e.g. machine identification, to the server 40. In preferred embodiments of the digital content store system 12, the machine identification comprises machine fingerprinting, available through AMToolkit™, by TryMedia Systems, Inc, of San Francisco, Calif.

In response to a proper license request 176, the fulfillment server 40 sends or streams 178 the license 20 to the client 16. The license 20 comprises both an asset key 22 and usage rights 24 for the asset 18. The request 176 for the license 20, the transmission 180 of machine characteristics 21 to the server 40, and the transmission 178 of the license 20 from the server 40, are preferably performed over a secure connection 181, e.g. https, established between the client machine 16 and the server 40. In some system embodiments, the secure session 181 comprises an authenticated session 181. In alternate system embodiments 12, the secure session 181 is initiated through a one-time, i.e. single use, ticket.

The download manager 162 binds the received license 20 to the client machine 16, and stores the asset key 22 in the secure key locker 26 (FIG. 1). In some system embodiments, the binding to a client machine 16 comprises a machine fingerprinting feature of AMToolkit™, available through TryMedia Systems, Inc, of San Francisco, Calif.

The download manager 162 also sends an acknowledgement 182 to the content fulfillment server 40, wherein the acknowledgement 182 comprises the receipt of the asset 18 and the license 20.

In some system embodiments, the download manager 162 comprises a portion of digital content player software 86, e.g. such as a subset of AOL MediaPlayer 244 (FIG. 6), available through America Online Inc. (AOL). The download manager 162 shown in FIG. 3 is preferably a tamper-resistant application, e.g. such as provided b y SAFEWRAP™, by Macrovision, Inc., in which unauthorized use, such as within the client machine 16, or between a client machine 16 and a content fulfillment server 40, is minimized or eliminated. Some embodiments of the download manager 162 also comprise one or more additional layers of license encryption.

Figure 4:
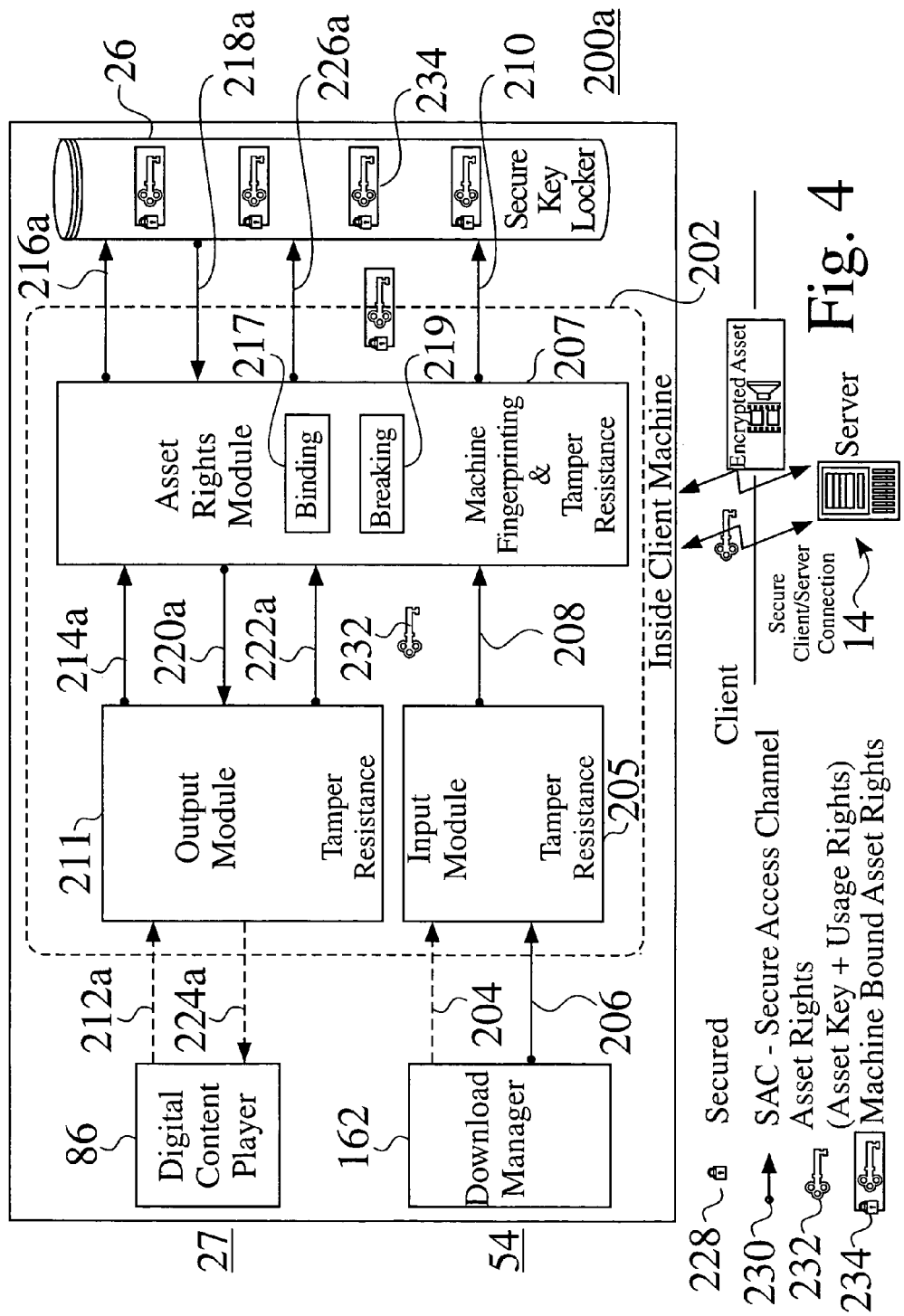
FIG. 4 is a schematic diagram of security systems download and playback operations for a client machine adapted to access a digital music store.
Figure 5:
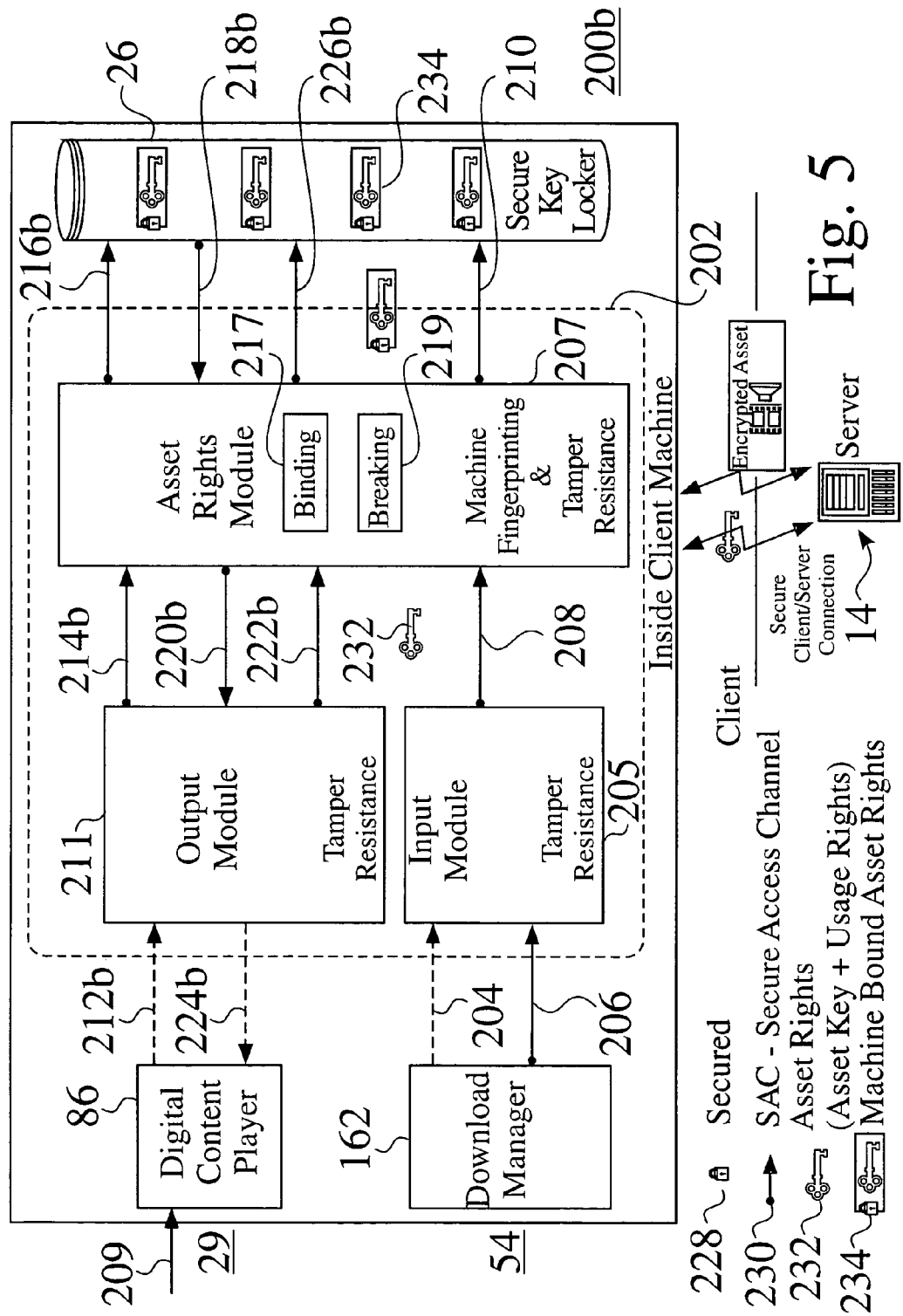
FIG. 5 is a schematic diagram of security systems download and burn operations for a client machine adapted to access a digital music store.

FIG. 4 is a schematic diagram 200a of download 54 and playback 27 security systems within a client machine 16 adapted to access a digital content store 14. FIG. 5 is a schematic diagram 200b of download 54 and burn 29 security systems within a client machine 16 adapted to access a digital content store 14.

As seen in FIG. 4 and FIG. 5, a client machine 16 typically comprises a digital content player 86, a download manager 162, an input module 205, an output module 211, an asset rights module 207, and a secure key locker 26. Some system actions between modules are preferably performed over secure access channels 230.

The input module 205 is preferably tamper resistant, such as provided by SAFEWRAP™, and provides encryption of asset keys 22, and encryption of usage rights 24.

The output module 211 is also preferably tamper resistant, and performs decryption of usage rights 24, determination of sufficient usage rights for assets 18, decryption of asset keys 22, and upon a proper request, decryption of encrypted assets 18 with the associated asset key 22. As well, if usage rights are to be affected by any action or use, the output module 211 follows the required steps for updating the asset rights into the secure key locker 26.

The asset rights module 207, which is preferably tamper resistant and uniquely linked to a client machine 16, such as through machine fingerprinting, provides a variety of secure functions, such as for downloading operations between the input module 205 and the secure key locker 26, or for playback or burn functions between the secure key locker 26 and the output module 211.

For example, the asset rights module 207 binds encrypted asset keys 22 to the client machine 16, combines machine-bound encrypted asset keys 22 and encrypted user rights 24 into asset rights, i.e. licenses 20, stores asset rights 20 within the secure key locker 26, retrieves the asset rights 20 as needed from the secure key locker 26, breaks asset rights 20 into asset keys 22 and usage rights 24, and unbinds asset keys as needed from the client machine 16.

Downloading Operations.

As seen in FIG. 4 and FIG. 5, the client machine 16 provides secure downloading on of encrypted assets 18 and licenses 20. Once an encrypted asset 18 is streamed or downloaded 174 (FIG. 3) to the download manager 162 at the client machine 16, the download manager stores 204 the encrypted asset 18 to a specified location, such as within the media database 82 (FIG. 2). The download manager 162 also transfers the downloaded 178 asset rights 20 to the input module 205, such as over a secure access channel 230, wherein the asset rights 20 comprise the associated asset key 22 and usage rights 24.

Upon encryption of the asset key 22 and usage rights 24, the input module 205 sends 208 the encrypted asset key 22 and encrypted usage rights 24 to the asset rights module 207, such as over a secure access channel 230. The asset rights module 207 binds 217 the encrypted asset key 22 to the client machine 16, combines the machine-bound encrypted asset key 22 and encrypted user rights 24 into machine bound asset rights 20, and stores 210 the machine-bound asset rights 20 within the secure key locker 26, typically over a secure access channel 230.

Playback Operations.

As seen in FIG. 4, the client machine 16 provides playback 27 of encrypted assets 18 associated with asset rights 20. Upon a user request 209 for a playback 27 of an encrypted asset 18, the digital content player 86 sends 212a a request to the output module 211, which in turn sends a corresponding request 214a to the asset rights module 207, such as over a secure access channel 230, to get the encrypted asset key 22 and encrypted usage rights 24 associated with the encrypted asset 18.

The asset rights module 207 sends a request 216a to the secure key locker 26, such as over a secure access channel 230, to get the machine-bound asset rights 234. In return, the machine-bound asset rights 234 which correspond to the encrypted asset 18 are sent 218a from the secure key locker 26 to the asset rights module 207, preferably over a secure access channel 230. The asset rights module 207 breaks 219 the machine-bound asset rights 234 into the encrypted asset key 22 and encrypted usage rights 24, and sends 220a the encrypted asset key 22 and encrypted usage rights 24 to the output module 211, preferably over a secure access channel 230.

The output module 211 decrypts the usage rights 24, and confirms that the playback 27 is allowed by the usage rights 24. If playback 27 is allowed, the output module decrypts the asset key 22 that is associated with the encrypted asset 18, and decrypts the encrypted asset 18 with the asset key, to serve 224a the playback request 212a.

If playback 27 is not allowed, the output module 211 typically prevents decryption and full playback 27 of the asset 18. In some preferred embodiments, the output module 211 may proceed to authorize the playback 27 of a portion or sample of the asset 18, which may be accompanied with a prompt or link to obtain asset rights 20 for the encrypted asset 18.

If usage rights are affected by playback, the output module 211 initiates the required steps to update asset rights 20 into the secure key locker 26. For example, the output module may update and encrypt the asset key 22 and usage rights 24, and send 222a the encrypted updated asset key 22 and usage rights 24 to the asset rights module 207, preferably over a secure access channel 230. The asset rights module 207 binds 217 the encrypted updated asset key 22 to the client machine 16, combines the machine-bound encrypted updated asset key 22 and encrypted updated user rights 24 into machine bound updated asset rights 20, and stores 226a the machine-bound updated asset rights 20 within the secure key locker 26, typically over a secure access channel 230.

Burn Operations.

As seen in FIG. 5, the client machine 16 preferably provides burn capabilities 29 of encrypted assets 18 associated with asset rights 20. Upon a user request 209 for a burn 29 of an encrypted asset 18, the digital content player 86 sends 212b a request to the output module 211, which in turn sends a corresponding request 214b to the asset rights module 207, such as over a secure access channel 230, to get the encrypted asset key 22 and encrypted usage rights 24.

The asset rights module 207 sends a request 216b to the secure key locker 26, such as over a secure access channel 230, to get the machine-bound asset rights 234. In return, the machine-bound asset rights 234 which correspond to the encrypted asset 18 are sent 218b from the secure key locker 26 to the asset rights module 207, preferably over a secure access channel 230. The asset rights module 207 breaks 219 the machine-bound asset rights 234 into the encrypted asset key 22 and encrypted usage rights 24, and sends 220b the encrypted asset key 22 and encrypted usage rights 24 to the output module 211, preferably over a secure access channel 230.

The output module 211 decrypts the usage rights 24, and determines if the burn 29 is allowed by the usage rights 24. If burn 29 is allowed, the output module 211 decrypts the asset key 22 that is associated with the encrypted asset 18, and decrypts the encrypted asset 18 with the asset key 22, to serve 224*b* the burn request 212*b*.

If the requested burn 29 is not allowed, the output module 211 typically prevents a burn of the asset 18. In some preferred embodiments, the output module 211 may proceed to authorize a playback 27 of a portion or sample of the asset 18, which may be accompanied with a prompt or link to obtain asset rights 20 for the encrypted asset 18.

If usage rights are affected by burn 29, the output module 211 initiates the required steps to update asset rights 20 into the secure key locker 26. For example, the output module may update and encrypt the asset key 22 and usage rights 24, and send 222*b* the encrypted updated asset key 22 and usage rights 24 to the asset rights module 207, preferably over a secure access channel 230. The asset rights module 207 binds 217 the encrypted updated asset key 22 to the client machine 16, combines the machine-bound encrypted updated asset key 22 and encrypted updated user rights 24 into machine bound updated asset rights 20, and stores 226*a* the machine-bound updated asset rights 234 within the secure key locker 26, typically over a secure access channel 230.

Digital Content Player.

Figure 6:
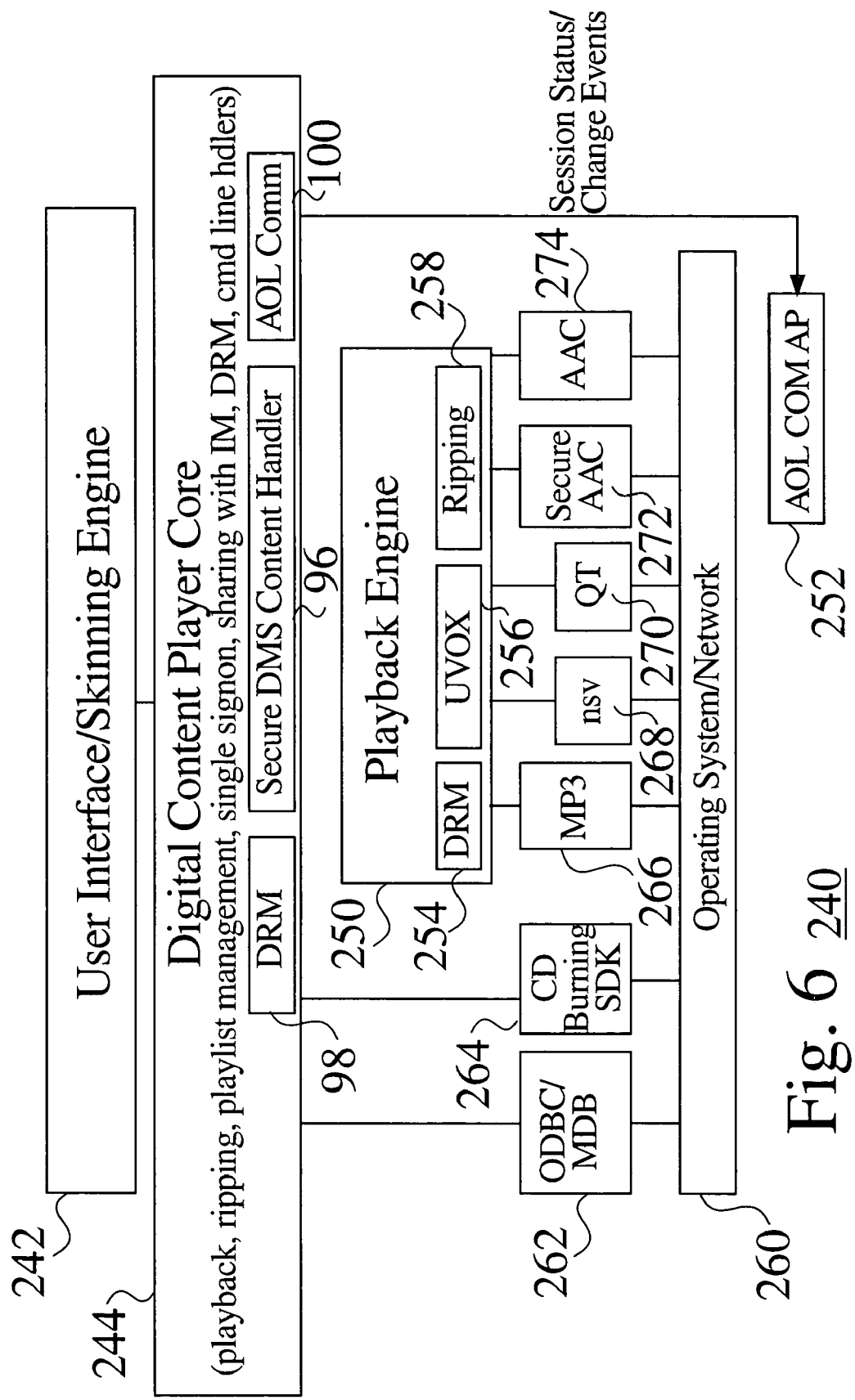
FIG. 6 is a functional block diagram of a digital content player associated with a digital music store system.

FIG. 6 is a functional block diagram 240 of a digital content, i.e. media, player 86 associated with a digital music store system 12. A digital content player user interface 242 is linked to the digital content player core 244, which typically comprises digital rights management 98, a secure digital music store content handler 96, and dedicated communications 100, such as linked to a communications applications 252, for session status and/or change of events. The digital content player core 244 typically handles playback, ripping, playlist management, sign on, sharing with instant messaging, digital rights management, and command line handlers.

The digital content player core 244 is linked to the operation system and network 260, such as through ODBC/MDB 262 and/or through CD burning SDK 264. A playback engine 250 is also linked to the operation system and network 260, such as to provide functionality for MP3 266, nsv 268, Quicktime™ (QT) 270, secure AAC 272, and/or AAC 274.

While some elements of the digital content player 86 are specific to operation within the digital content store system 12, other elements, such as the playback engine 250, are preferably shared by one or more music client products, e.g. such as for internet radio. As well, some elements may be provided through codec plugins.

Content Intake and Asset Processing.

FIG. 7 is a schematic diagram 300 of content intake 308, content acquisition and processing 118 and the establishment of an associated asset license 20. A raw asset 304, such as audio, video, game, or multimedia content 304, is typically provided from a source 302, such as from a label 124 (FIG. 2). The raw asset 304 typically comprises associated metadata 306, such as comprising title information, artist information, run time, and/or bonus content. Other metadata 306 associated with the content 304 may be received from the source 302, such as but not limited to pricing, royalty, and/or marketing information, which may or may not be distributed with the content 304.

The content acquisition and processing 118 comprises asset encoding and encryption 120. In some embodiments of the digital content store system 12, encryption of a received asset 304 comprises NSS encryption or 128-bit AES encryption, such as specified at http://csrc.nist.gov/CryptoToolkit/aes/. An associated asset key 22 is generated for the encrypted asset 18, such as by random generation, e.g. 128-bit random generation. While the asset key 22 is preferably unique to different encrypted assets 18, the same asset key 22 is preferably used, i.e. the key 22 is reused or shared, for content delivered to multiple users USR and/or recipients RCP, which simplifies digital music store operations and provides fast delivery of content 18.

The encrypted asset 18 file typically also comprises an ETK, DMS, or other file extension, wherein the file comprises an asset/file header, comprising header length, encryption cipher type, and asset metadata, along with the encrypted asset 18.

The content acquisition and processing module 118 uploads encrypted assets 18 to the download server 110, which acts as content storage 110 (FIG. 2) for the digital content store 14. Some embodiments of the system 12 store asset licenses 20, which comprise asset keys and associated usage rights 24, on the license server 312. As seen in FIG. 2, asset keys 22 may be stored in a keys database 114, while content metadata 306 and usage rights 24 is stored separately 112 from the asset keys 22.

The combined intake, processing, and storage of encrypted assets 18 and associated asset rights 20 provides a secure means to make assets available for licensed purchase and subsequent use through the digital content store 14.

Asset Rights.

Figure 8:
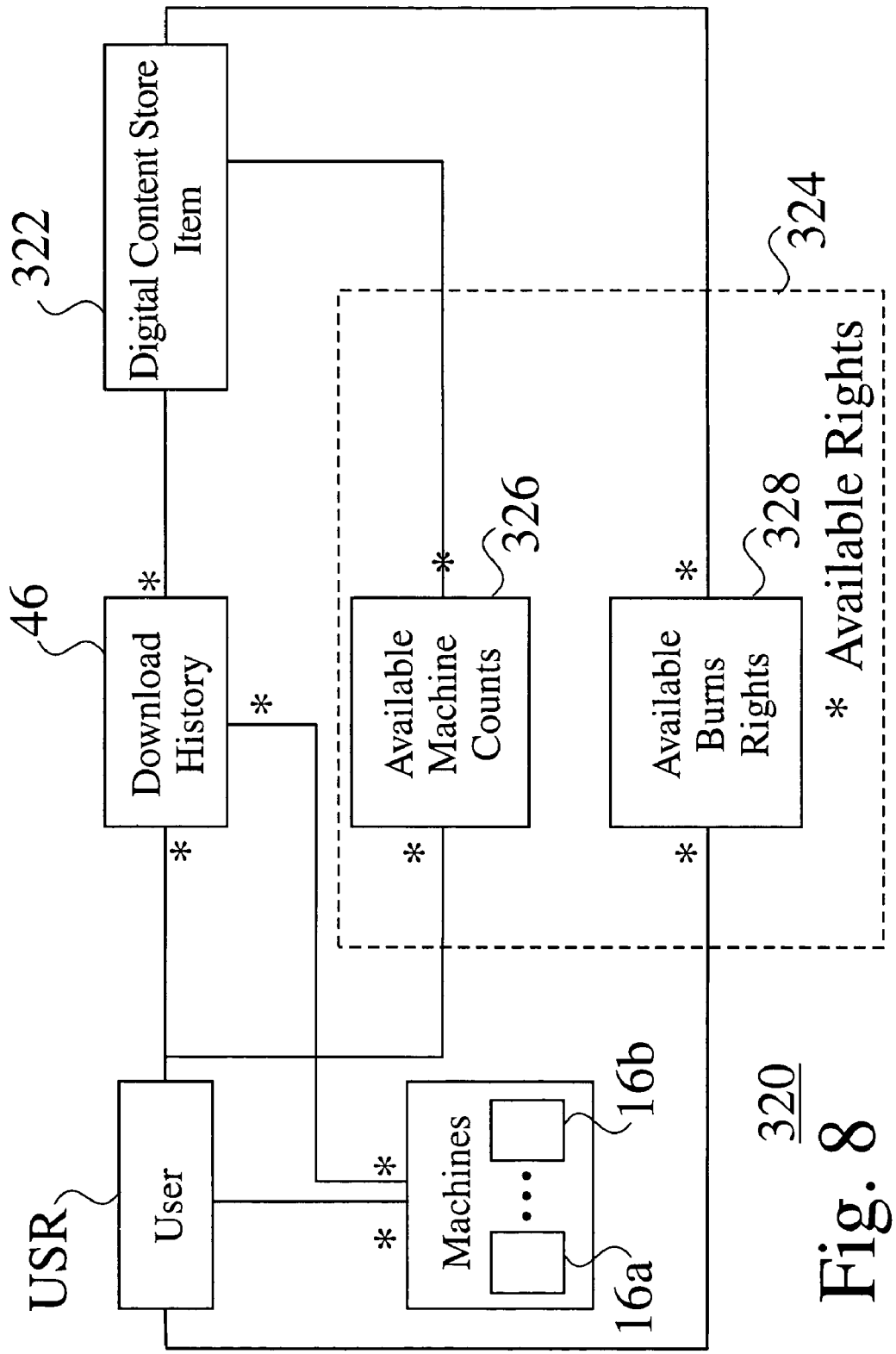
FIG. 8 is a functional block diagram of a draft data model within a digital music store system.

FIG. 8 is a functional block diagram of a draft data model 320 within a digital content store system 12. As seen in FIG. 8, a user USR may access the digital content store 14 from one or more machines 16.

For example, a user who is interested in an item, e.g. a song 16, that is available from the digital content store 14 can enter purchase information 34 (FIG. 1) from any client machine 16. Use 324 of the content 322, such as an encrypted asset 18, may include any combination of allowed burns 328, or playing 326 of the content from a given machine 14.

As well, usage of the content 18 may include the controlled specification of one or more machines 16 from which the purchased asset 18 may be associated. For example, while a user may purchase access to a song 18 from a desktop computer 16*a*, the user may also desire to play the acquired song at a mobile computer 16*b*, or at another alternate terminal 16, e.g. such as during travel. As well, a user may wish to burn a compact disk CD, such as for personal use or for a gift, either at a primary computer 16 having burn capabilities, or at an alternate terminal 16 that comprises burn capabilities.

Extended Asset Rights.

Figure 9:
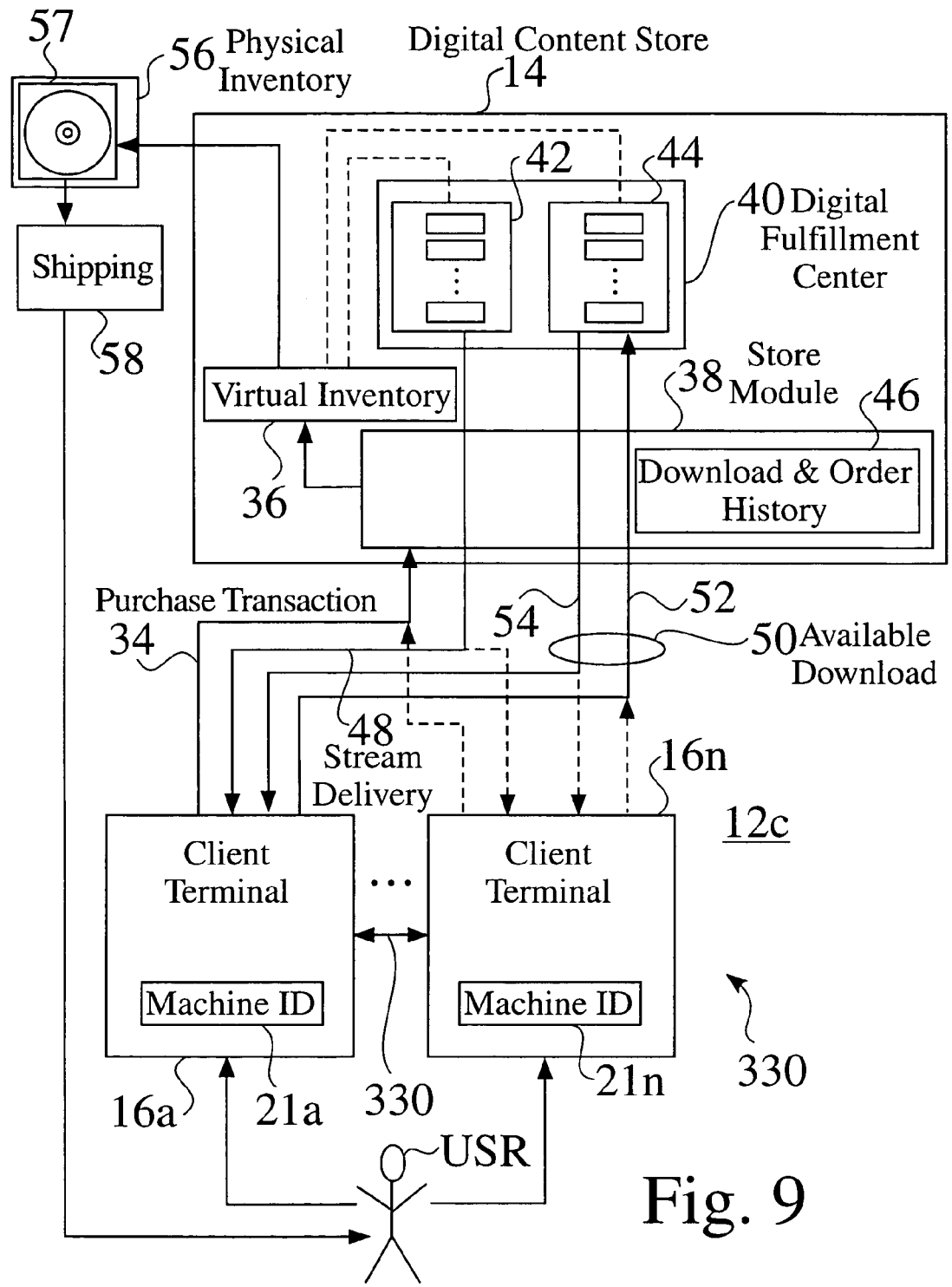
FIG. 9 is a schematic diagram of physical content purchase and availability of streamed and/or downloadable content.

The digital music store system 12 provides users USR with an opportunity to go to the content store 14 for single or multiple music tracks. FIG. 9 is a schematic diagram 330 of physical content purchase and availability of streamed and/or downloadable content.

Figure 10:
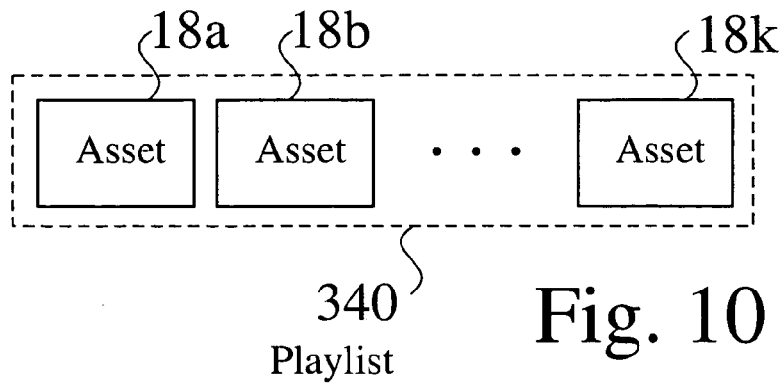
FIG. 10 is a functional block diagram of a playlist.

FIG. 10 is a functional block diagram of a playlist 340, comprising one or more assets 18*a*-18*k* arranged for playback 27, ripping, i.e. burning 29, or loading 31. For example, a user USR may selectively arrange different playlists 340, such as to play for work, leisure, parties, commuting, and/or exercise, e.g. "Bob's Favorite Gnarly Surf Music".

Different embodiments of the digital content store system 12 may comprise different usage rights 24 for an acquired asset 18, such as to allow a user to play and/or burn a song 18 or a playlist 340 a set number of times, e.g. unlimited playing 27 and ten burns 29, and/or to allow a user USR to play 27 and/or burn 29 a song 18 or playlist 340 on a set number of client machines 16, e.g. on three machines 16.

In the digital music store system 12, a burn limit may apply either to each song 18 individually, or may apply to a playlist 340, which comprises one or more songs 18, as specified by a user USR, to be burned 29 or loaded 31.

Security of Content.

Figure 11:
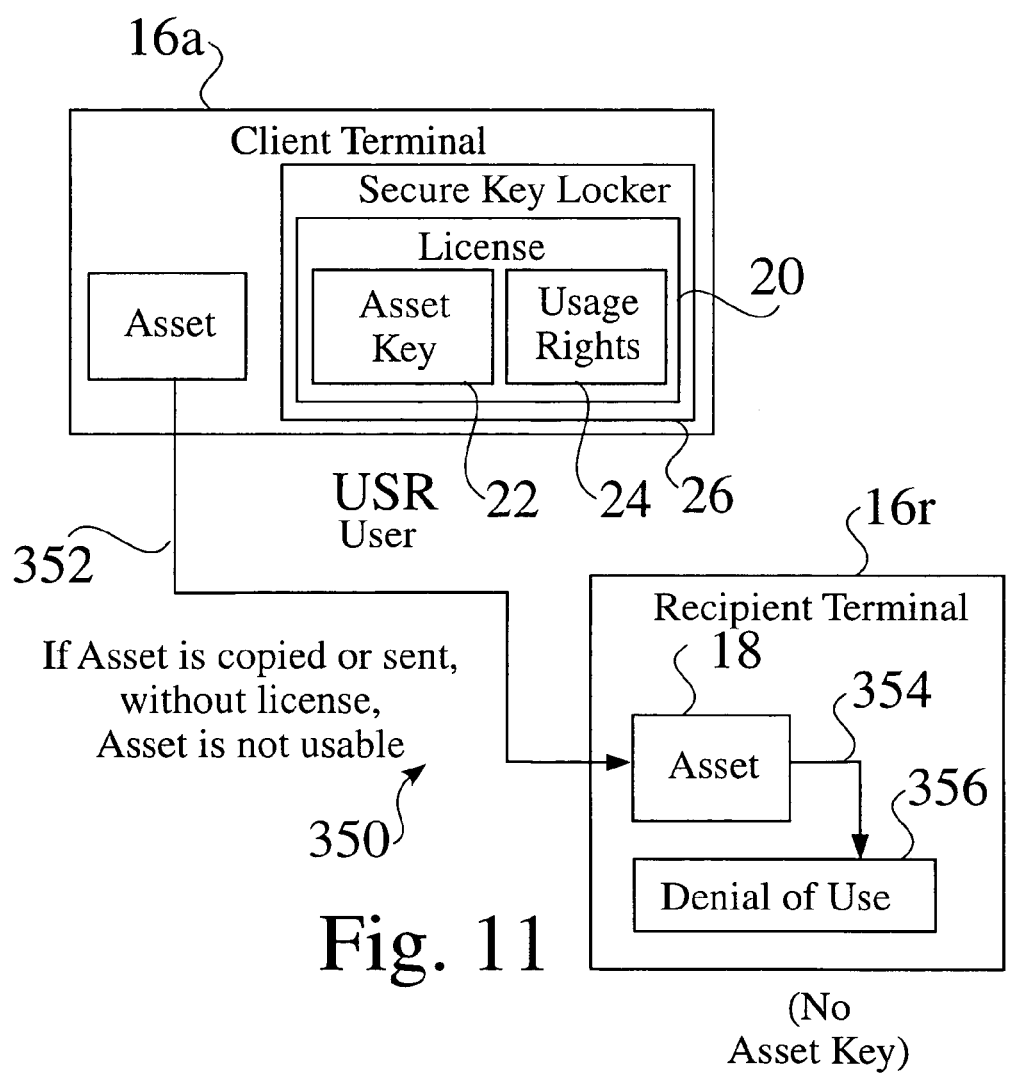
FIG. 11 is a schematic diagram of a transfer of an encrypted asset and prevention of asset use without associated license.

The digital music system 12 prevents unauthorized use 27, 29, 31 of encrypted assets 18 from client machines 16 which do not have proper authorization. For example, FIG. 11 is a schematic diagram 350 of a transfer 352 of an encrypted asset 18, without a proper transfer or extension of asset rights or license 20, from a client machine 16*a* to a recipient machine 16*r*. As seen in FIG. 11, an attempt 354 to use 27, 29, 31 an encrypted asset 18, without proper asset rights 20, results in a denial of use 356 of the encrypted asset 18.

Figure 12:
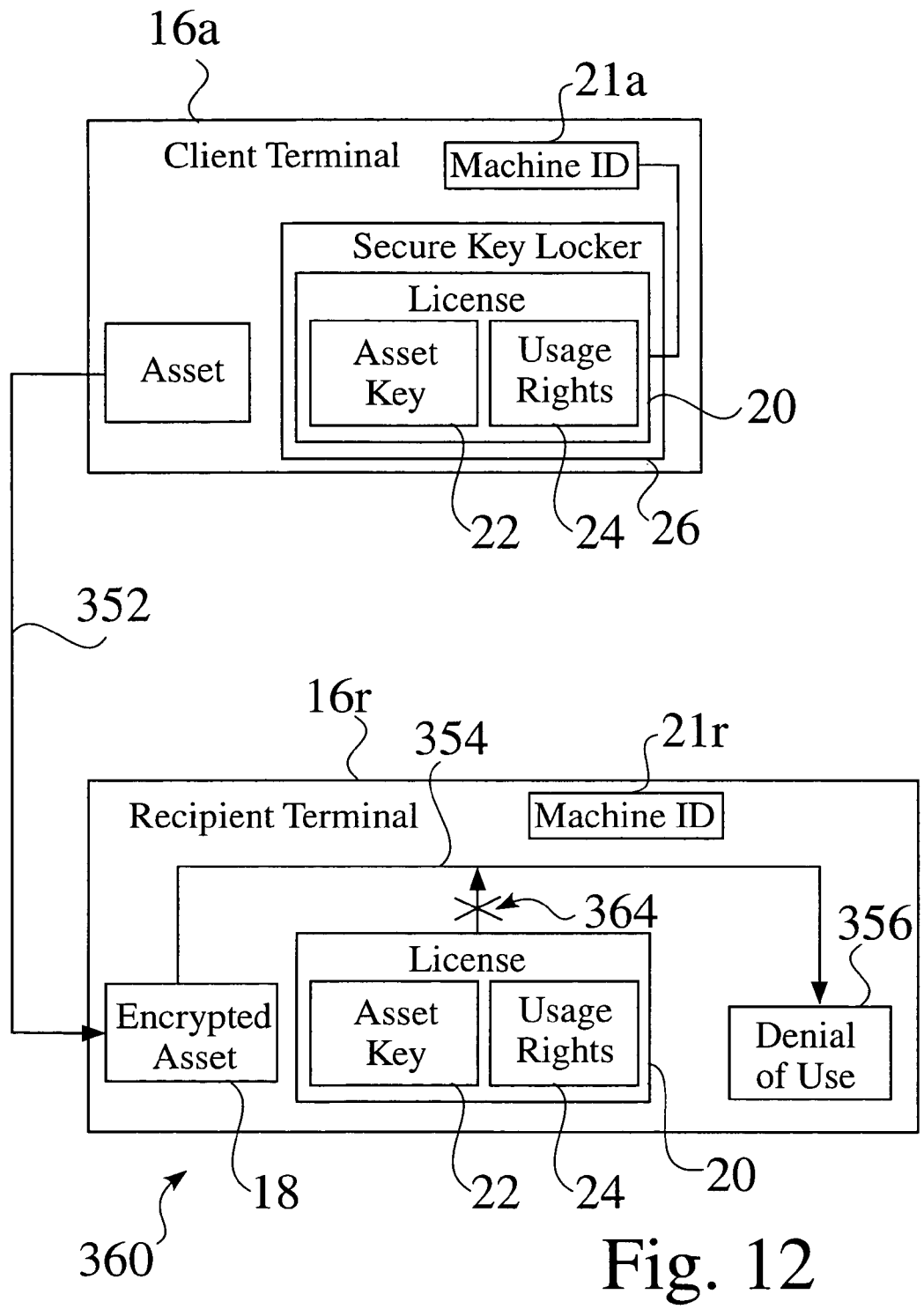
FIG. 12 is a schematic diagram of a transfer of an encrypted asset and prevention of asset use without an authorized license.
Figure 15:
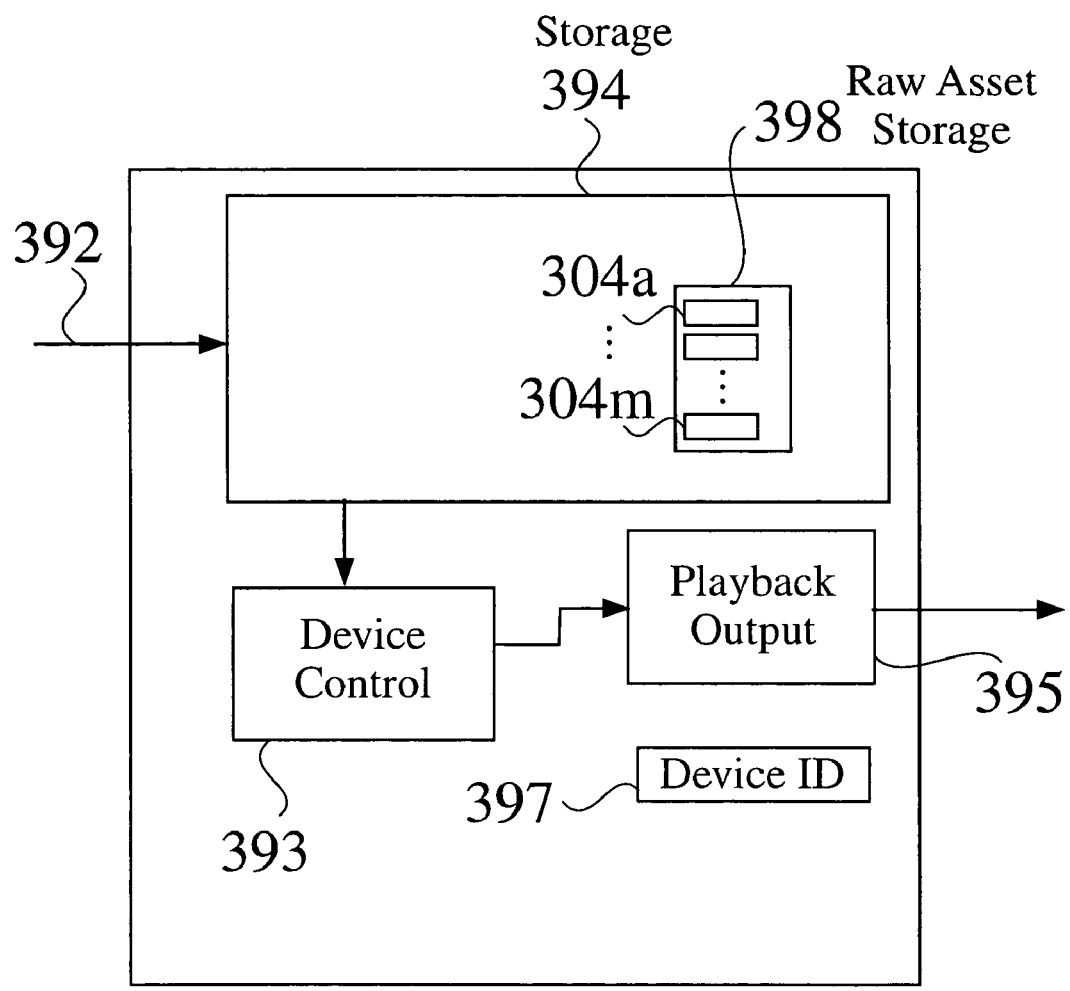
FIG. 15 is a functional block diagram of a basic digital music player.
Figure 16:
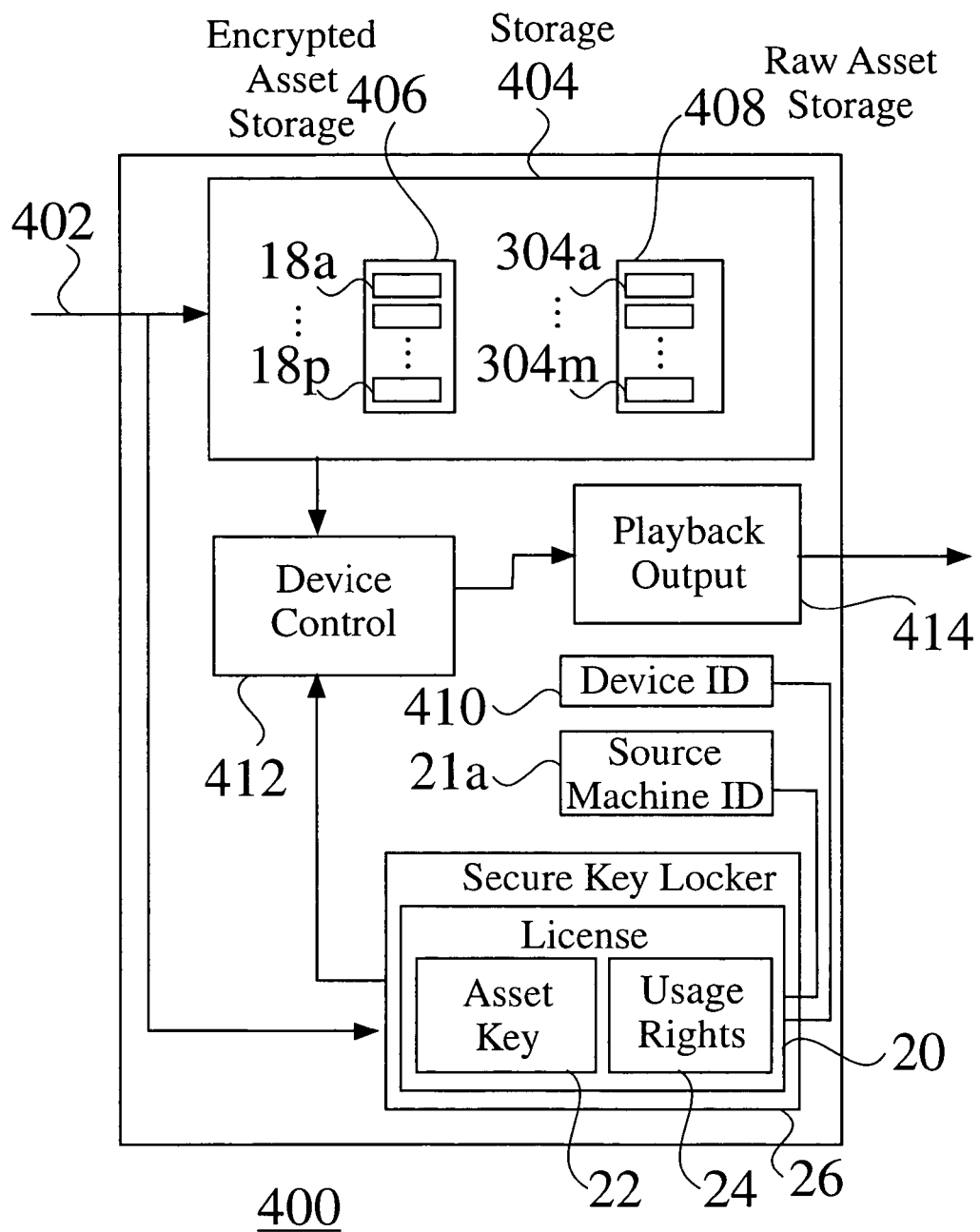
FIG. 16 is functional block diagram of a digital music player comprising asset security.

FIG. 12 is a schematic diagram 360 of a transfer 352 of an encrypted asset 18, with an improper transfer of an associated license 20, from a client machine 16*a* to a recipient machine 16*r*. As seen in FIG. 12, an attempt 354 to use 27, 29, 31 an encrypted asset 18, with an attempted use 364 of asset rights 20, results in a denial of use 356 of the encrypted asset 18. Therefore, even if an encrypted asset 18 is sent with a "copy" of an associated license, the encrypted asset 18 is still unusable 364, since usage rights 24 are linked to authorized usage 27, 29, and/or 31, such as within a machine 16 having proper ID 21*a*, e.g. machine fingerprinting, or within an authorized transfer 330 (FIG. 9) of the encrypted asset 18 to another machine 16 or device 390, e.g. 390*a*,390*b* (FIG. 15,FIG. 16)

Figure 13:
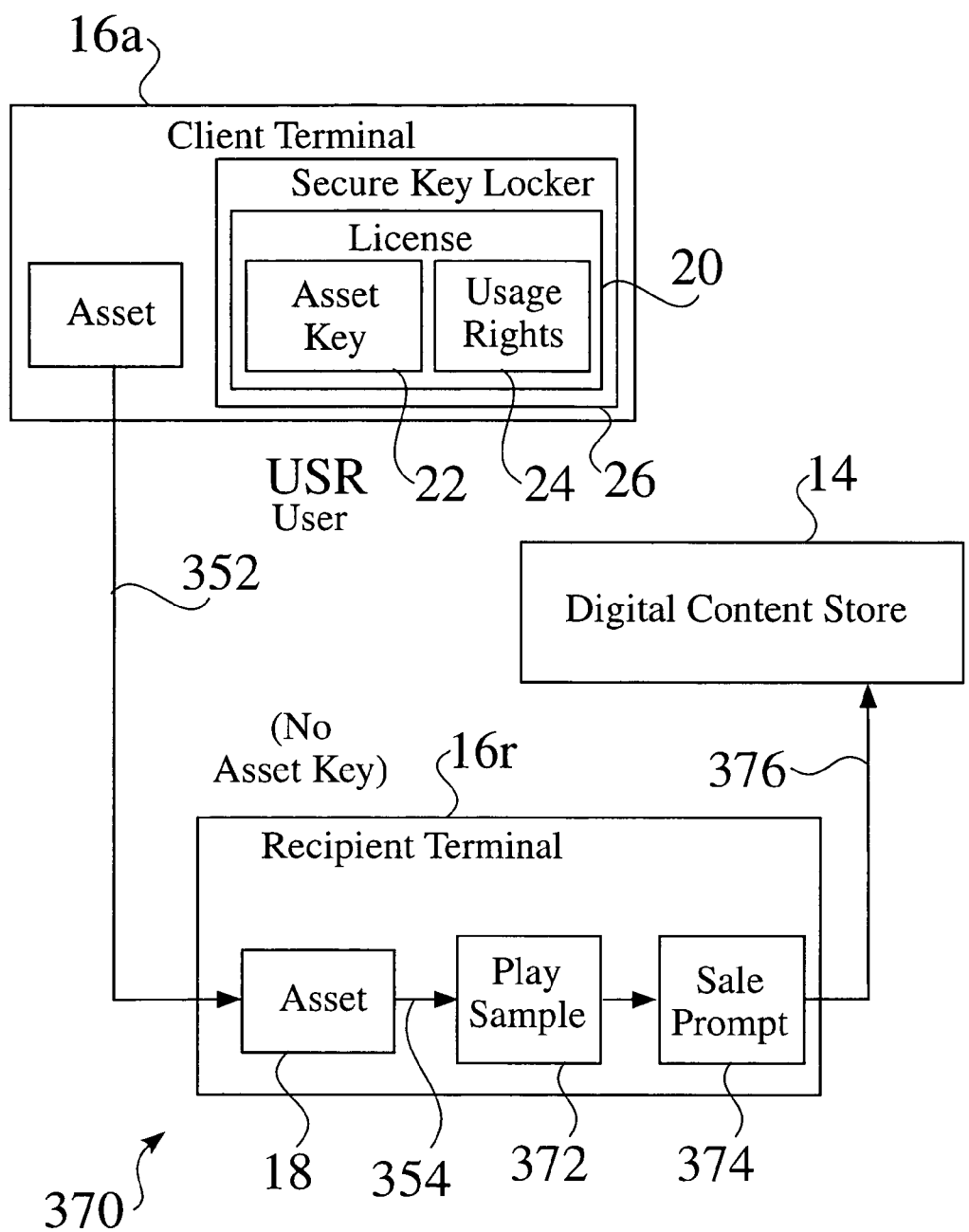
FIG. 13 is a schematic diagram of a transfer of an encrypted asset and a system prompt to establish authorized use for the asset.

FIG. 13 is a schematic diagram 370 of a transfer of an encrypted asset 352 and a system prompt 356 to establish authorized use for the encrypted asset 18. In some embodiments of the digital music store system 12, the transfer 352 of an asset without the proper transfer of asset rights 20 does not necessarily result in an absolute denial of use 356. For example, as seen in FIG. 13, upon an attempt 354 to use 27, 29, 31 an encrypted asset 18 which lacks proper asset rights 20, a user USR or recipient RCP may be presented with a prompt 374 to access 376 the digital music store 14, such as to purchase the encrypted asset 18 and/or asset rights 20. As well, a sample 372 of the asset 18, e.g. such as a sound clip, movie trailer, or game demo sample, may be played for the user USR or recipient RCP, such as provide a teaser or sales incentive to establish proper asset rights 20.

Mixed Media Capabilities and Transfer of Assets or Asset Claims.

Some embodiments of the digital content store system 12 provide mixed media capability, wherein digital assets 18 and/or physical media 57 may be purchased within the same content store 14. For example, as seen in FIG. 1, a user USR may purchase a physical compact disk or DVD 57, which is shipped 58, and/or may purchase digital assets 18, such as a digital album comprised of assets 18.

As well, in some embodiments of the digital music store system 12, a user USR who purchases physical media 56 may additionally be provided with the ability to stream or download any or all of the album comprised of encrypted assets 18. A user USR can then quickly access and use desired content 18, as specified within associated asset rights 20, while waiting for the physical media 56 to be delivered. The digital rights 20 are controlled by the digital rights management system and a back-end enabling system associated with the digital content store 14.

Figure 14:
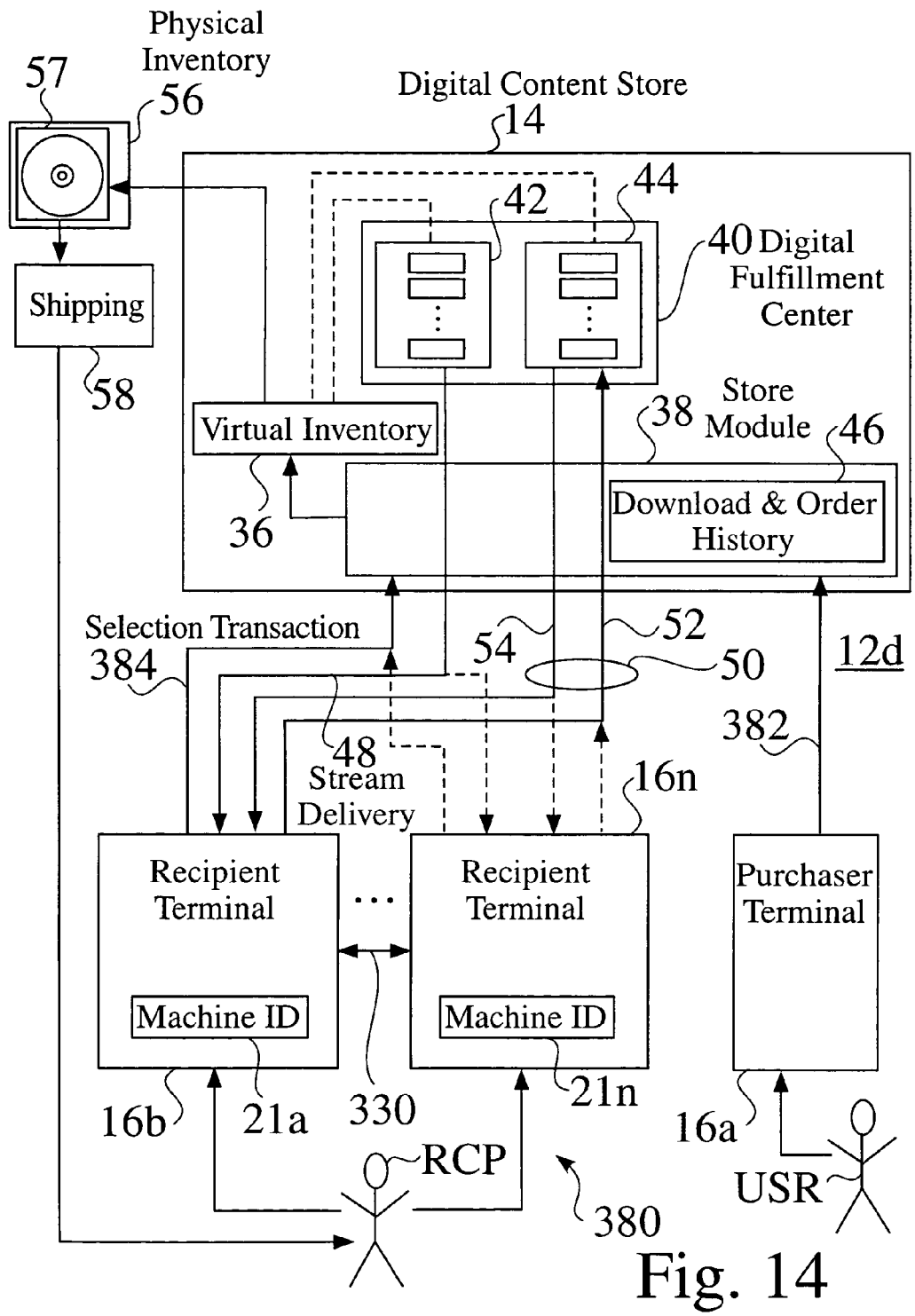
FIG. 14 is a schematic diagram of physical content purchase for an alternate recipient and availability of streamed and/or downloadable content.

FIG. 14 is a schematic diagram 380 of a digital music store system 12*d*, in which a user USR can purchase physical content 57 and or digital content 18 for an alternate recipient RCP, wherein the content is streamed 48 or downloaded 54 to the recipient machine 16*b*,16*n*. As well, the purchaser user USR can preferably provide purchase information 382, such as for a monetary amount of physical content 57 and/or digital content 18, wherein the recipient RCP can enter a selection information 384, e.g. such as to redeem a gift or allowance toward desired content 57, 18.

Digital Content Players.

FIG. 15 is a functional block diagram of a basic digital content player 390. Digital content 18 is typically processed within the client machine 16, and input 392 into the player 390, such as stored 394 as one or more raw digital assets 304*a*-304*n*. The device 390 provides playback 395 of one or more songs 18 or playlists 340 (FIG. 10), through device control 393.

FIG. 16 is functional block diagram of a digital music player 400 comprising asset security for encrypted assets 18. Encrypted content 18*a*-18*p* is typically transferred from a client machine 16, in compliance with allowed usage rights 24. Some embodiments of the player 400 additionally provide storage and playback of raw, i.e. unencrypted assets 304*a*-304*m*. As seen in FIG. 16, the player 400 typically comprises similar internal digital rights management capabilities, such as a secure key locker 26, and an extended license 20, comprising asset keys 22 and usage rights 24 for the encrypted content 18. The player may typically store one or more device IDs 21, to track the source machine 16 from which content 18 is received. As well, the device preferably comprises a device ID 410, which is used for machine-bound content management. In some embodiments of the secure content player 400, the player 400 is considered to be a client machine 16, such as for licensing purposes. In alternate embodiments of the secure content player 400, the player 400 is considered to be an independent player, such as for licensed usage allowed for a user USR of one or more client machines 16.

System Advantages.

The digital content store system 12 and associated methods provide significant advantages over existing content sales and delivery systems. The versatility of the digital content store system 12 readily provides a key entry point for the purchase of content assets 18, such as but not limited to music, video, game, and/or software commerce. For example, in a digital content store system 12 implemented as a digital music store system 12, users USR can search and browse a catalog of downloadable music, such as integrated with a physical goods store 57, providing a physical inventory of music and/or movies.

Furthermore, some embodiments of the digital content store system 12 allow streaming or download of music and/or video programming, such as to provide internet enabled broadcasting of content, whereby a user USR can readily access and purchase desired content, such as if the listener user likes a song or artist which is played through the digital content player 86.

The digital content store system 12 provides transparent rights management and commerce-enabled sharing of assets 18. For example, when a user consumes, buys, or shares media, the digital content store system 12 intelligently manages the rights to the media. When a user USR shares and asset 18, the digital content store system 12 preferably enables either the sharer user USR or sharee recipient RCP to purchase rights to the media 18.

The digital content store system 12 provides a facility through which a user USR can readily browse and purchase usage rights 34 for secure digital assets 18, and prevents casual users from "stealing" assets.

The digital content store system 12 also provides controlled defined usage, such as to provide basic "counters based" digital rights management, as currently required by labels 124, such as to provide a limited number of burns, as specified by standard Redbook Audio™ standards, or to provide user ownership on a specified number of machines, e.g. three machines 16.

As well, the digital content store system 12 is readily flexible to meet the needs of future digital rights management standards, since there is minimal impact on code, or on purchased assets.

Protection and Rights Management.

In the digital content store system 12, each raw asset 306 is typically pre-encrypted with a unique, symmetric asset key 22, wherein the asset can only be played using this associated asset key 22. When a user USR purchases an encrypted asset 18, the asset key 22 and usage rights 24 are seamlessly downloaded 54. A license 20, comprising both the usage rights 24 and asset key 22, are preferably downloaded over a secure client/server channel, e.g. such as though SSL.

The user's order and download history 46 are stored on the server, and the user's machine ID (GUID) 21 is stored on the server, as part of the download history 46. The license 20 is bound to the machine 16, such as through "machine fingerprinting", and is stored in the secure key locker 26. As well, client modules that use the licenses 20 and assets 18 are preferably protected using tamper-resistance, e.g. such as provided b y SAFEWRAP™, by Macrovision, Inc.

The digital content store system 12 provides a significant music distribution channel, via digital downloads in a secure format. Copy-protection within the digital content store system 12 is a secure yet simple solution. The digital content store system 12 prevents illegal copying of individual songs from one machine 16 to another, while providing legitimate customers with the ability to use their songs 18 in a reasonable manner. As well, the digital content store system 12 enables simple rights management concerning CD burning.

Although the digital content store system 12 has an understanding of rights management, the system 12 is easy to deploy, and is transparent to the end user. For example, assets 306 are preferably protected using symmetric-key encryption. Once protected, the encrypted assets 18 is safe from all but the most sophisticated attackers, and encrypted assets 18 can be moved around at will by customers. Without the associated asset key 22 for an encrypted asset 18, however, the encrypted asset 18 cannot be played. An asset key 22 is bound to usage rights 24 at the moment of purchase 34, to create a license 20, and valid licenses 20 are only issued by the content store 14. Thus, only customers USR who have purchased valid licenses 20 through the store are able to play back 27 the encrypted asset 18.

In order to prevent users from being able to move licenses around, each license 20 is bound to a specific machine 16 at the time the license 10 is issued, which prevents users from transferring licenses 20. Machine fingerprinting is preferably used to bind the license 20 to the machine 20, and then the license 20 is stored in a secure key locker 26. Usage information, e.g. like the burn count, is also stored in the secure key locker 26. As well, the download module 205, the playback module 211, and the usage rights module 207 are preferably tamper-resistant, such as provided by SAFEWRAP™, by Macrovision, Inc., to deter reverse-engineering.

In preferred embodiments of the digital content store system 12, content assets 304 are protected by symmetric-key encryption using a secret asset key 22. Each separate asset 304 is protected with a unique asset key 22, but every copy of that asset uses the same asset key 22. Thus, two purchasers USR purchasing the same song 304 receive identically protected assets 18 and identical keys 22. During the content intake process 300 (FIG. 7), incoming assets 304 are preferably encoded into 96-Kbps Dolby AAC, and then encrypted using 128-bit AES in CBC mode. The encrypted encoded assets 18 are then preferably packaged in an ".etk" format, which adds an unencrypted metadata header.

Once encrypted, these assets 18 are well protected, since without the key 22, AES encryption is very difficult to crack. The digital music store system 12 is designed with knowledge that users commonly try to move and/or distribute content 304,18. Since encrypted assets 18 can not be played back without an associated key 22, encrypted assets 18 provide no value for unauthorized use or distribution.

Asset keys 22 can only be obtained through the digital music store 14. Once users have purchased a song, they can download the key on up to N machines, where N is configurable. At present, the default value is three machines. Users USR can also preferably download as many times as they want to the same N machines, in case they accidentally delete the file or their hard drive crashes. Once the user has reached their maximum number of allowed machines, the store does not issue new keys 22, unless the user purchases more licenses 20.

When a customer purchases an asset 18, that purchase is associated with a predetermined set of usage rights 24, which are combined with the asset key 22 to form a license 20. In some embodiments of the digital music store system 12, usage rights 24 only comprise limits on the number of times a user USR can burn a particular asset to CD. Once on the client machine 16, licenses 20 are bound to the machine 16, such as by machine fingerprinting. Both the licenses and the meter counts (for CD burning) are stored in the secure key locker 26.

Burning 29 is currently less secure that playing 27, because burning requires that the digital content player 86 write out the asset as an unprotected .wav file, which is currently a limitation of CD burning libraries. Since the burning process 29 necessarily exposes the content in standard Redbook™ CD audio format, there is currently no available alternative. After the burning is considered successful, the burn count stored in the secure key locker 26 is updated to reflect the new count.

System Options.

Some embodiments of the digital content store system 12 provide a variety of optional benefits for users USR and/or recipients RCPs. For example, the system 12 may preferably provide a free burn count to a complaining user for list of his purchased assets. In such an embodiment, a user USR is typically directed to download this additional burn usage right to the machine 16, such as during the next burn attempt of content 18. As well, the system 12 may preferably provide an additional machine count to a complaining user, such as in exchange for a list of purchased assets 18. Furthermore, customer can buy additional "licenses" for the same song 18, to extend usage on more machine 16 or players 400. In addition, the system 12 may be readily adapted to provide the same or different usage rights to multiple users USR on a single machine 16. In some system embodiments 12, a customer care server at the digital store 14 preferably allows the user to view download history, whereby user USR provides machine ID 21 to view a download history on a specific machine 16.

Although the digital content store system and methods of use are described herein primarily in connection with the secure purchase, delivery and playback of music, i.e. songs and/or albums, the apparatus and techniques can be implemented for a wide variety of digital content, such as a wide variety of audio content, e.g. songs, dialog, discussion, video content, multimedia content, game or video game content, art content, or any combination thereof, as desired.

Although the digital content store system and methods of use are described herein in connection with personal computers, mobile devices, and other microprocessor-based devices, such as portable digital assistants or network enabled cell phones, the apparatus and techniques can be implemented for a wide variety of electronic devices and systems, or any combination thereof, as desired.

As well, while the digital content store system and methods of use are described herein in connection with interaction between a client machine and one or more digital content stores across a network, such as the Internet, the digital content store system and methods of use can be implemented for a wide variety of electronic devices and networks or any combination thereof, as desired.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. A process, comprising the steps of:
purchasing usage rights for an encrypted asset by sending purchase information from a client machine to a store server; sending a ticket from the store server to the client machine, the ticket comprising an asset ID corresponding to the encrypted asset; launching a download manager at the client machine with the received ticket; sending an asset request for the encrypted asset using the asset ID from the launched download manager at the client machine to a fulfillment server; sending the encrypted asset from the fulfillment server to the client machine in response to the received asset ID; sending a license request from the client machine to the fulfillment server; sending a license from the fulfillment server to the client machine, the license comprising an asset key and the usage rights associated with the encrypted asset; encrypting the asset key and the usage rights at the client machine; binding the encrypted asset key to the client machine; combining the machine-bound encrypted asset key and encrypted user rights into machine-bound asset rights; storing the machine-bound asset rights within a secure key locker within the client machine; sending an acknowledgement of the receipt of the encrypted asset and the license from the client machine to the fulfillment server; receiving a user request at an output module within the client machine, the user request received from a user for use of the encrypted asset; sending an asset rights request from the output module through a tamper resistant asset rights module within the client machine to the secure key locker to get the machine-bound asset rights; receiving the machine-bound asset rights at the tamper resistant asset rights module from the secure key locker in response to the asset rights request; breaking the machine-bound asset rights at the tamper resistant asset rights module into the encrypted asset key and the encrypted usage rights; sending the encrypted asset key and the encrypted usage rights from the tamper resistant asset rights module to the output module; decrypting the machine-bound encrypted usage rights at the output module; authenticating the user request based upon the machine-bound usage rights; based upon the authentication of the user request, performing one of the following steps, either: decrypting the encrypted asset key, decrypting the encrypted asset with the decrypted asset key, and serving the user request, or preventing use of the asset; and updating the machine-bound usage rights within the secure key locker within the client machine based on the authentication of the request.

2. The process of claim 1, further comprising the steps of:
saving the encrypted asset to an asset store at the client machine; and
attaching machine characteristics to the license.

3. The process of claim 2, wherein the machine characteristics comprise a unique identifier associated with the client machine.

4. The process of claim 2, wherein the machine characteristics comprise a unique machine fingerprint associated with the client machine.

5. The process of claim 2, further comprising the step of:
launching a digital content player to play the encrypted asset at the client machine.

6. The process of claim 5, wherein the digital content player allows usage of the purchased encrypted asset on the client machine if the asset key and the machine-bound usage rights associated with the purchased encrypted asset are present at the client machine.

7. The process of claim 6, wherein the allowed usage of the purchased encrypted asset is determined by the machine-bound usage rights associated with the purchased encrypted asset.

8. The process of claim 5, wherein the digital content player prevents usage of the purchased encrypted asset on the client machine if the asset key and machine-bound usage rights associated with the purchased encrypted asset are absent from the client machine.

9. The process Of claim 1, wherein the purchased encrypted asset comprises any of a song, an album, a video, a movie, and a video game.

10. The process of claim 9, further comprising the step of:
playing a sample of the asset if the digital content player detects any that the key is missing or is not valid for the client machine.

11. The process of claim 10, further comprising the step of:
presenting the user with a purchase opportunity.

12. The process of claim 11, further comprising the step of:
transferring the user to the digital music store to complete the process if the user chooses to purchase based upon the presented purchase opportunity.

13. The process of claim 1, wherein the use of the encrypted asset comprises playing the asset.

14. The process of claim 1, wherein the use of the encrypted asset comprises burning the asset to a medium.

15. The process of claim 1, wherein the use of the encrypted asset comprises loading the asset to a digital content player.

* * * * *